United States Patent
Hara et al.

(10) Patent No.: US 11,276,205 B2
(45) Date of Patent: Mar. 15, 2022

(54) IMAGE PROCESSING APPARATUS AND IMAGE PROCESSING METHOD

(71) Applicant: CANON KABUSHIKI KAISHA, Tokyo (JP)

(72) Inventors: Kenjiro Hara, Kounosu (JP); Akihiro Yoshitani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 293 days.

(21) Appl. No.: 16/691,351

(22) Filed: Nov. 21, 2019

(65) Prior Publication Data
US 2020/0167967 A1 May 28, 2020

(30) Foreign Application Priority Data
Nov. 28, 2018 (JP) .............................. JP2018-222719

(51) Int. Cl.
*G06T 9/00* (2006.01)
*G06T 1/20* (2006.01)
*G06T 1/60* (2006.01)

(52) U.S. Cl.
CPC .............. *G06T 9/007* (2013.01); *G06T 1/20* (2013.01); *G06T 1/60* (2013.01)

(58) Field of Classification Search
None
See application file for complete search history.

(56) References Cited

U.S. PATENT DOCUMENTS

| | | | | |
|---|---|---|---|---|
| 9,094,615 B2* | 7/2015 | Aman | ................. | G06K 9/00711 |
| 9,872,654 B2* | 1/2018 | Kogure | ................. | A61B 6/032 |
| 10,535,161 B2* | 1/2020 | Budagavi | ............. | H04N 19/503 |
| 11,012,692 B2* | 5/2021 | Fracastoro | ........... | H04N 19/147 |
| 11,093,194 B2* | 8/2021 | Tsugimura | ......... | G06K 15/1817 |
| 2003/0218781 A1* | 11/2003 | Suino | ........................ | G06T 5/50 358/3.26 |
| 2006/0139446 A1* | 6/2006 | Kuroki | ................. | H04N 19/427 348/14.13 |
| 2008/0225053 A1* | 9/2008 | Obinata | .................... | G09G 5/39 345/555 |
| 2008/0226164 A1* | 9/2008 | Obinata | ................. | H04N 19/50 382/166 |
| 2015/0374313 A1* | 12/2015 | Kogure | .................. | H04N 19/17 382/131 |
| 2017/0078577 A1* | 3/2017 | Wakamatsu | ....... | H04N 5/23267 |
| 2018/0041710 A1* | 2/2018 | Wakamatsu | ....... | H04N 5/23267 |
| 2018/0338143 A1* | 11/2018 | Fracastoro | ........... | G06K 9/6247 |

FOREIGN PATENT DOCUMENTS

JP 2006304243 A 11/2006

* cited by examiner

*Primary Examiner* — Anand P Bhatnagar
(74) *Attorney, Agent, or Firm* — Canon U.S.A., Inc. IP Division

(57) ABSTRACT

An image processing apparatus performs, in a case where an image targeted for processing is rotated, predetermined compression processing on a predetermined block targeted for processing by referring to a block which differs according to a rotational angle. Then, the image processing apparatus performs predetermined decompression processing on compressed data corresponding to the predetermined block by referring to a block referred to in the predetermined compression processing performed on the predetermined block.

19 Claims, 16 Drawing Sheets

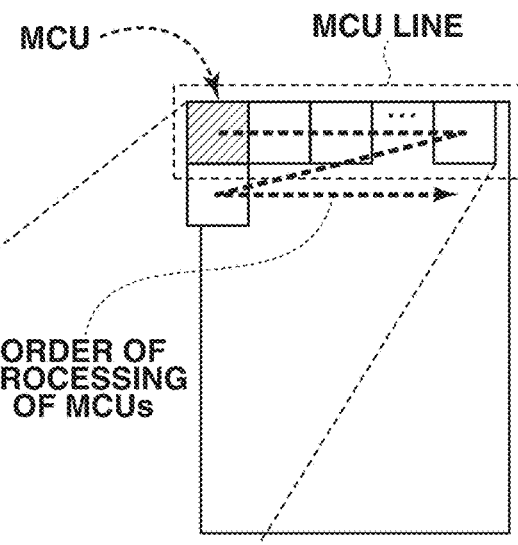
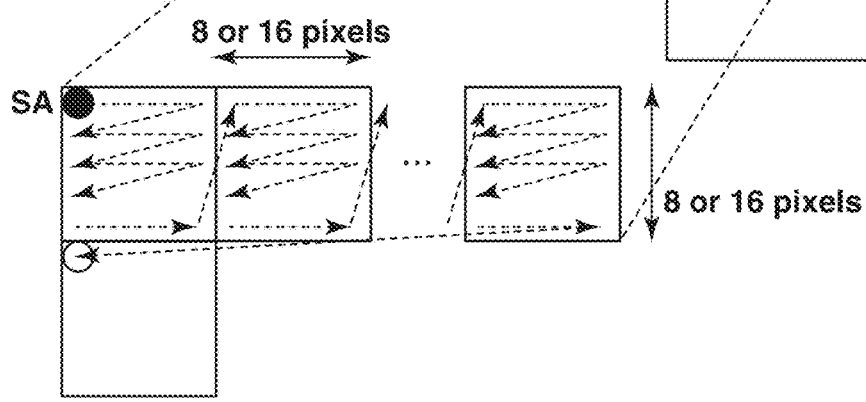
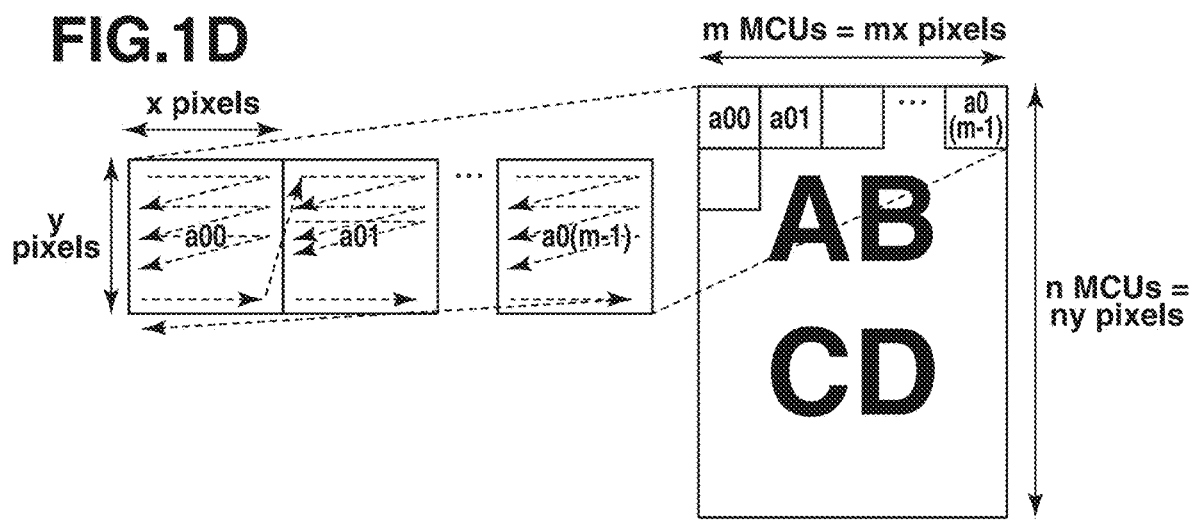

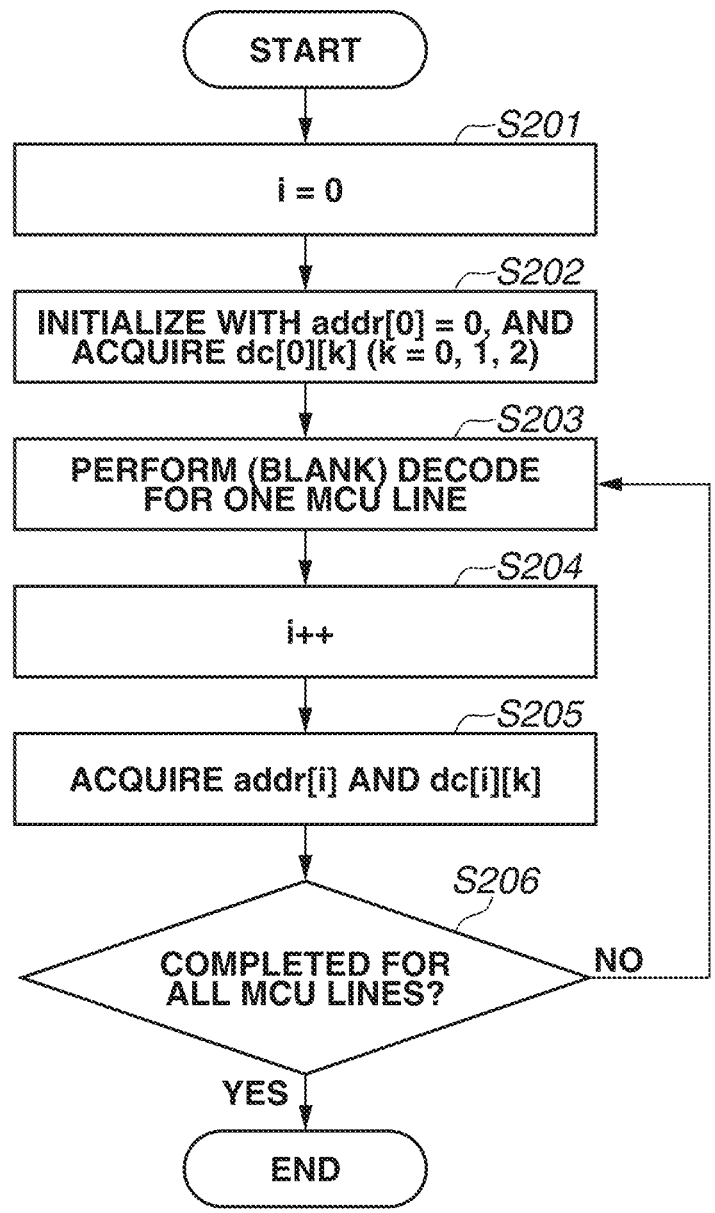

COMPRESSION PROCESSING DURING
CLOCKWISE 270-DEGREE ROTATION OUTPUT

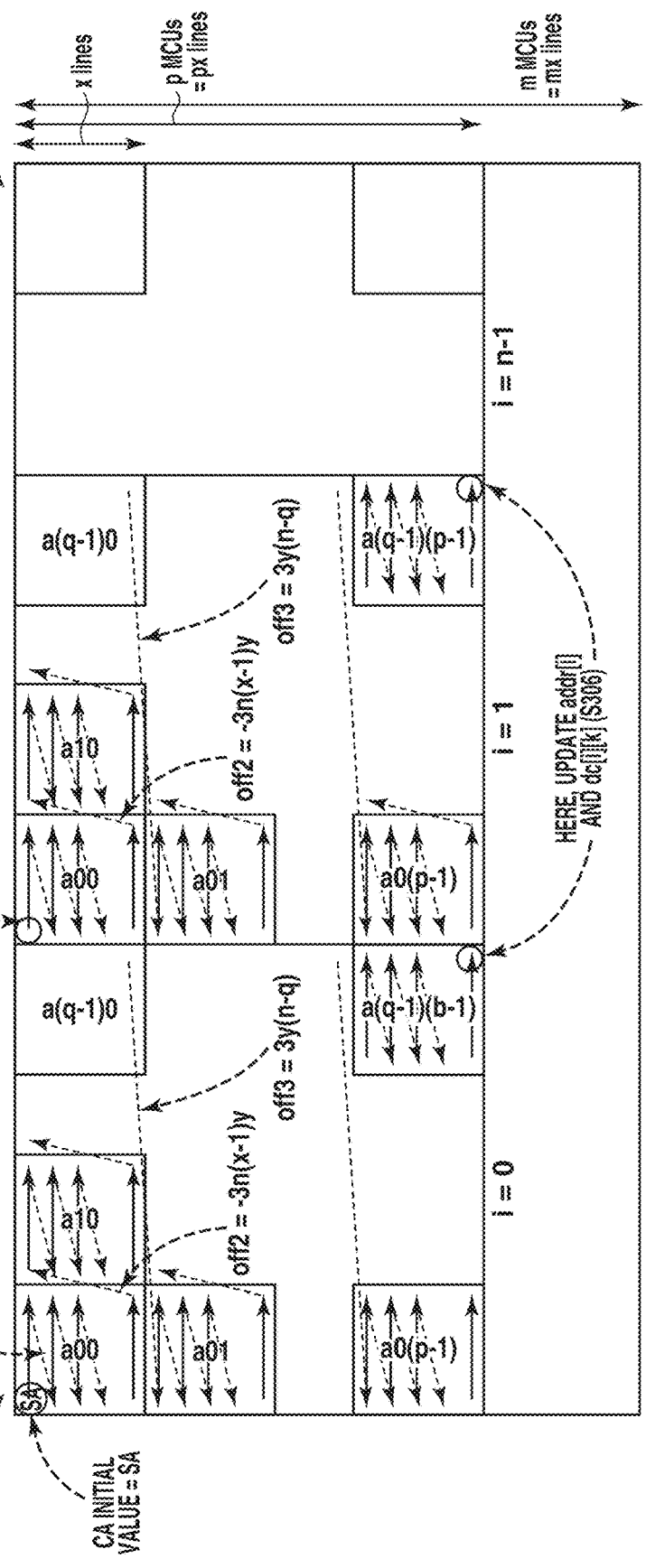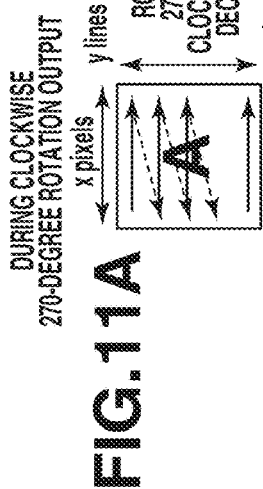

IMAGE PROCESSING APPARATUS AND IMAGE PROCESSING METHOD

BACKGROUND OF THE INVENTION

Field of the Invention

Aspects of the present disclosure generally relate to an image processing apparatus and an image processing method each of which performs compression processing and decompression processing of an image which is subjected to rotation.

Description of the Related Art

There is Joint Photographic Experts Group (JPEG), which is one of global standards for a multivalued digital still image coding method. To efficiently compress and decompress a huge amount of data about a color still image, JPEG defines a coding algorithm using a coding method attained with a combination of discrete cosine coding, quantization, and Huffman coding.

Furthermore, in handling image data, it may be intended to rotate an input image by a predetermined angle. For example, there is a case of printing, by a printer, a JPEG image acquired from a recording medium such as a compact-disc read-only memory (CD-ROM) or taken into a personal computer via, for example, the Internet. In this case, it may be intended to output the JPEG image while the JPEG image is in the state of having been rotated 90 degrees, 180 degrees, or 270 degrees. In such a case, a method of restoring the entirety of a JPEG image serving as a target and subsequently apply rotation processing to the restored JPEG image by a predetermined angle can be conceived.

However, this method not only requires a large-capacity memory for temporarily retaining the entirety of the restored image but also causes issues in that performing rotation processing on a large amount of image data increases the amount of time required for rotation processing and also increases load on the system. For example, if such restoration, retention, and rotation processing operations for JPEG images are designed to be performed by a printing apparatus, the cost of memory required in the printing apparatus is high and load to be imposed by processing operations also increases.

Japanese Patent Application Laid-Open No. 2006-304243 discusses sequentially performing rotation and decoding operations on respective portions of an image. Specifically, to rotate a JPEG image 90 degrees, an image processing circuit obtains addresses of alternating-current components (AC components) and values of direct-current components (DC components) of a block at the left end portion of image data, thus generating an analysis table. Next, the image processing circuit refers to addresses of the AC components stored in the analysis table, and acquires data corresponding to the block at the left end portion of image data, thus decoding AC components, also decoding values of DC components, and outputting the decoded AC components and DC components. Then, permutation processing is performed on the output components by a circuit located at the subsequent stage of the image processing circuit, so that row data subjected to rotation is obtained.

However, the JPEG rotation processing discussed in Japanese Patent Application Laid-Open No. 2006-304243 necessitates performing a blank decode analysis, in which decoding is performed even on a block that is not output, to acquire direct-current component values of a given block. Therefore, as compared with rotation processing of JPEG image data which uses a page memory, the time spent on analytical processing is increased.

SUMMARY OF THE INVENTION

Aspects of the present disclosure are generally directed to providing a technique to reduce the usage amount of memory and perform processing at higher speed in performing compression and decompression of an image which is subjected to rotation.

According to an aspect of the present disclosure, an image processing apparatus includes a compression unit configured to perform predetermined compression processing on each of a plurality of blocks included in an image targeted for processing, an execution unit configured to perform predetermined decompression processing and rotation processing on compressed data obtained by the predetermined compression processing performed by the compression unit, and an output unit configured to output decompressed data obtained by the predetermined decompression processing and the rotation processing performed by the execution unit, wherein, after decompressed data corresponding to a first portion of the image targeted for processing is output by the output unit, the execution unit performs the predetermined decompression processing and the rotation processing on a second portion of the image targeted for processing, and wherein in the predetermined compression processing performed on a predetermined block included in the first portion, the compression unit refers to a block which is different according to a rotational angle in the rotation processing in such a manner that compressed data corresponding to a block included in the second portion is not referred to in the predetermined decompression processing performed on the first portion.

Further features of the present disclosure will become apparent from the following description of exemplary embodiments with reference to the attached drawings.

BRIEF DESCRIPTION OF THE DRAWINGS

FIGS. 1A, 1B, 1C, and 1D are diagrams illustrating orders of processing of a plurality of blocks (minimum coded units (MCUs)) and orders of processing of pixels included in each MCU in Joint Photographic Experts Group (JPEG) compression processing.

FIG. 2 is a flowchart illustrating an example of blank decode processing in the case of performing rotation by 90 degrees in JPEG decompression.

FIGS. 11A, 11B, 11C, and 11D are diagrams illustrating orders of processing at the time of image decompression accompanied by a clockwise 270-degree rotation.

DESCRIPTION OF THE EMBODIMENTS

Figure 3:
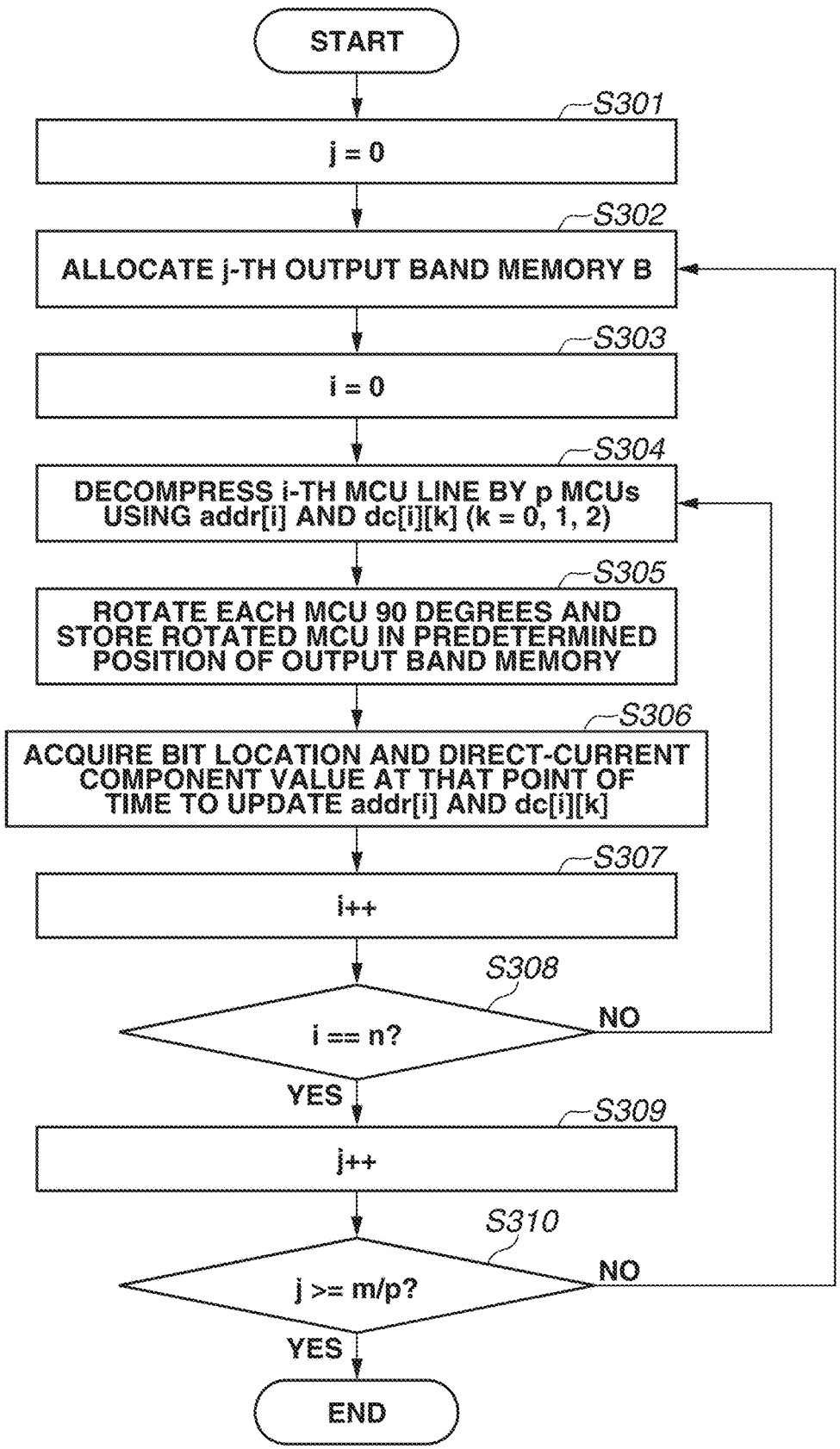
FIG. 3 is a flowchart illustrating an example of processing for rotating a JPEG image 90 degrees clockwise and decompressing the rotated JPEG image.

Various exemplary embodiments, features, and aspects of the invention will be described in detail below with reference to the drawings.

To describe a first exemplary embodiment, first, processing for performing decompression (herein also referred to as "decode") of Joint Photographic Experts Group (JPEG) image data generated by compression (herein also referred to as "encode") performed by JPEG compression processing is described. In JPEG compression and decompression, an uncompressed image is divided into a plurality of blocks (herein also referred to as "minimum coded units (MCUs)"), and compression and decompression are performed on each block. Here, a group of MCUs aligned in a single horizontal row in JPEG image data is hereinafter referred to as an "MCU line". Decompression processing to be described here enables performing decompression processing for 90-degree rotation in a memory region smaller than a page memory with use of bit locations and direct-current component values of respective color components in each MCU line in decompression processing of the entire JPEG image data.

FIGS. 1A, 1B, 1C, and 1D are diagrams illustrating orders of processing of MCUs and orders of processing of pixels included in each MCU in JPEG compression processing. Processing to be described with reference to FIGS. 1A to 1D is usual JPEG compression processing. The processing to be described with reference to FIGS. 1A to 1D is performed by, for example, a JPEG compressor 503 and a compressive DMAC 504, which is a direct memory access controller (DMAC) for compression control, described below with reference to FIG. 5.

In JPEG-compressing uncompressed image data, input image data is divided into units of MCUs, each of which is composed of 16 pixels in horizontal and vertical directions, and compression processing is sequentially performed on the MCUs in order from top left, as indicated by a heavy dotted line illustrated in FIG. 1A. Specifically, the compressive DMAC 504 accesses the respective MCUs of image data stored in a memory 510 (FIG. 5) in the order indicated by the heavy dotted line illustrated in FIG. 1A. Then, the MCUs sequentially read in by the access are input to the JPEG compressor 503, and are sequentially JPEG-compressed for each MCU.

Here, suppose that the numbers of pixels in horizontal and vertical directions of one MCU of the JPEG image data are x and y, respectively, as illustrated in FIG. 1D, and the numbers of MCUs in horizontal and vertical directions of the JPEG image data are m and n, respectively, as illustrated in FIG. 1C. Thus, the image size is mx pixels in horizontal direction and ny pixels in vertical direction, and one MCU line is composed of m MCUs.

The JPEG compressor 503 performs predetermined compression processing on compression target data of the input MCU with the address of a pixel at the upper left end of the MCU set as a start address (SA) while performing scanning for every pixel in the raster order from the left end in the MCU, as illustrated in FIG. 1B. Specifically, in JPEG compression which is performed on MCUs by the JPEG compressor 503, image data of each MCU is converted into data of frequency components by discrete cosine transform (DCT) being performed on each MCU. The data of frequency components is divided into a direct-current (DC) component and an alternating-current (AC) component.

Then, when compression performed on a given MCU is completed, an MCU on the right-hand side of the given MCU becomes a new target for processing to be performed by the JPEG compressor 503, so that JPEG compression is similarly performed on the right-hand side MCU. Furthermore, as a direct-current component value of each MCU, a difference between an actual direct-current component value of the MCU and an actual direct-current component value of an MCU subjected to compression one MCU before is calculated and then stored. However, with regard to an MCU located at the upper left end of an image, not the above-mentioned difference but an actual direct-current component value is stored as a direct-current component value of the MCU.

When processing for one MCU line is completed, similar processing is performed starting with an MCU at the left end of the next MCU line. This processing is continued until the end of one page is reached, so that JPEG image data for one page is generated. The above-described processing is usual processing for JPEG compression.

When rotating 90 degrees and then decompressing JPEG image data compressed in the above-mentioned manner, first, the usual JPEG processing acquires a bit location and a direct-current component value of an MCU line at the left end included in JPEG image data. FIG. 2 is a flowchart illustrating an example of blank decode processing in the case of performing rotation by 90 degrees in JPEG decompression. Furthermore, each processing operation in the flowchart of FIG. 2 is performed by a JPEG decompressor 505 and a decompressive DMAC 506, which are described below with reference to FIG. 5.

In step S201, the decompressive DMAC 506 initializes a loop counter i, which is used to cause similar processing to be performed for every MCU line, as i=0.

In step S202, the decompressive DMAC 506 initialize a variable addr[i] as variable addr[0]=0, and acquires dc[0][k] with respect to a variable dc[i][k] (k=0, 1, 2). Here, addr[i] is a variable representing a starting bit location of an MCU which is processed first out of MCUs targeted for processing in the i-th MCU line of JPEG image data. In FIG. 2, addr[i]

is a variable representing a write starting bit location in a band memory of each MCU of an MCU line which is processed first (at the time of a clockwise 90-degree rotation, a vertical MCU line at the left end). The variable dc[i][k] represents an actual direct-current component value of each MCU of an MCU line which is processed first (at the time of a clockwise 90-degree rotation, a vertical MCU line at the left end). "k=0, 1, 2" represents a Y component (luminance component), a Cb component (blue-difference chroma component), and a Cr component (red-difference chroma component), respectively.

Processing illustrated in FIG. 2 is performed on a vertical MCU line at the left end of JPEG image data. Therefore, in step S202, dc[0][k], which is an actual direct-current component value of the upper left MCU of JPEG image data, is acquired. Here, an actual direct-current component value dc[1][k] of the second MCU from the top in a vertical MCU line at the left end of an image is able to be obtained from the direct-current component value dc[0][k] acquired in step S202. Specifically, the actual direct-current component value dc[i][k] is able to be obtained by sequentially adding a direct-current component value in the uppermost MCU line (the zero-th MCU line) of an image (a difference in actual direct-current component value from an MCU at the left-hand side) to the direct-current component value dc[0][k] acquired in step S202. Furthermore, at this time, actual direct-current component values of MCUs other than the left-end MCU in the uppermost MCU line (the zero-th MCU line) of an image are temporarily stored in the JPEG decompressor 505, but are sequentially overwritten. An operation of, to obtain an actual direct-current component value with respect to a given MCU, obtaining an actual direct-current component value of another MCU and temporarily storing the obtained actual direct-current component value in the above-described way is referred to as "blank decode". Blank decode does not necessitate conversion of frequency component data into image data and image outputting. Therefore, in blank decode, inverse DCT processing is not performed and only a Huffman code analysis needs to be performed.

In step S203, the decompressive DMAC 506 accesses JPEG image data stored in, for example, the memory 510 and inputs the JPEG image data, and the JPEG decompressor 505 blank-decodes the input JPEG image data for one MCU line. As described below, processing in step S203 is repeatedly performed for the respective MCU lines. Therefore, when step S203 is performed for the first time with "i=0" being set, blank decode is performed for the uppermost MCU line of an image.

After blank decode for one MCU line in step S203 is completed, then in step S204, the decompressive DMAC 506 increments the loop counter i.

In step S205, the decompressive DMAC 506 acquires and stores a bit location addr[i] and a direct-current component value dc[i][k] obtained as a result of blank decode processing performed in step S203 with respect to an MCU at the left end and in the i-th MCU line. When step S205 is performed for the first time, the bit location addr[i] and the direct-current component value dc[i][k] are acquired with respect to the second MCU from the top at the left end of an image. The bit location addr[i] and the direct-current component value dc[i][k] stored in this way are used to obtain actual direct-current component values of MCUs other than at the left end, as described below with reference to FIG. 3.

In step S206, the JPEG decompressor 505 determines whether blank decode for the left-end MCU is completed with respect to all of the MCU lines of the input JPEG image data. If the result of the determination in step S206 is YES (YES in step S206), the processing illustrated in FIG. 2 ends, and, if the result of the determination in step S206 is NO (NO in step S206), the processing returns to step S203.

The above-described flow enables acquiring a bit location and a direct-current component value of the left-end MCU of each MCU line of the input JPEG image data.

Next, processing for rotating a JPEG image 90 degrees clockwise and decompressing the rotated JPEG image is described. FIG. 3 is a flowchart illustrating an example of processing for rotating a JPEG image 90 degrees clockwise and decompressing the rotated JPEG image. Furthermore, before the processing illustrated in FIG. 3 is performed, the processing illustrated in FIG. 2 is performed. Moreover, the processing illustrated in FIG. 3 is also performed by the JPEG decompressor 505 and the decompressive DMAC 506.

Figure 4:
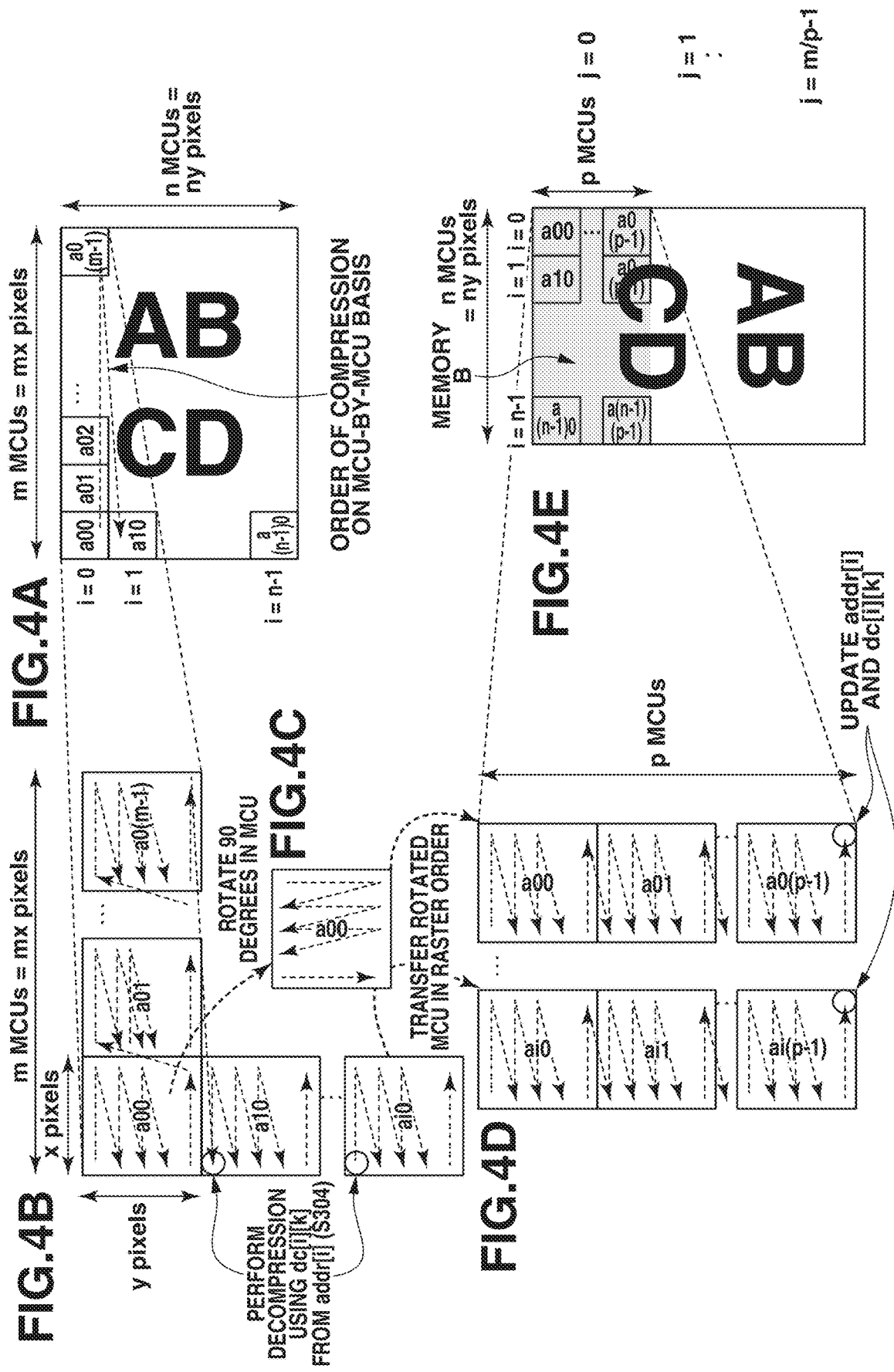
FIGS. 4A, 4B, 4C, 4D, and 4E are diagrams illustrating an example of an operation of rotating a JPEG image 90 degrees clockwise and decompressing the rotated JPEG image.

Moreover, FIGS. 4A, 4B, 4C, 4D, and 4E are diagrams illustrating an example of an operation of rotating a JPEG image 90 degrees clockwise and decompressing the rotated JPEG image. Here, suppose that an image illustrated in FIG. 4A is JPEG-compressed, and the JPEG-compressed image is subjected to a 90-degree rotation by the decompression processing illustrated in FIG. 2 and FIG. 3 as an image illustrated in FIG. 4E.

Furthermore, the decompressive DMAC 506 is previously provided with a memory B (memory region) capable of storing, in an uncompressed manner, pixel values obtained by decompression of ny×px pixels (for p vertical MCU lines of an input image), which is located in the decompressive DMAC 506. For example, if each pixel is expressed with three, i.e., red (R), green (G), and blue (B), color components and each color component is represented by 8 bits (1 byte, a value of 0 to 255), the memory capacity of the memory B becomes 3×ny×px bytes. As illustrated in FIG. 4E, ny×px pixels are equivalent to pixels for p vertical MCU lines of the rotated image. The number of lines p is set as p<m in such a way as not to exceed the upper limit m of the number of vertical MCU lines in the entire image and in such a way as to prevent a memory region for one page from being used. Moreover, the decompressive DMAC 506 writes the starting bit location addr[i] and the actual direct-current component value of the left-end MCU of the image, which have been acquired in step S205 illustrated in FIG. 2, in the memory region.

In step S301, the decompressive DMAC 506 initializes a counter j as j=0. Furthermore, a target for decoding is changed for every p vertical MCU lines by processing described below. The counter j indicates p vertical MCU lines targeted for decoding.

In step S302, the decompressive DMAC 506 waits for the above-mentioned memory B from being deallocated.

In step S303, the decompressive DMAC 506 initializes a counter i as i=0. The counter i indicates a horizontal MCU line targeted for the current decoding, and a compressed image for p vertical MCU lines in the horizontal MCU line is decompressed.

In step S304, the decompressive DMAC 506 acquires the bit location addr[i] and the actual direct-current component value dc[i][k] (k=0, 1, 2) of JPEG image data previously acquired in step S205 illustrated in FIG. 2. Moreover, the decompressive DMAC 506 accesses p MCUs corresponding to the j-th output band memory. Then, the JPEG decompressor 505 performs predetermined decompression processing on only p MCUs with respect to the i-th horizontal MCU line in the JPEG image data input by the access with use of the direct-current component value. The predetermined decompression processing includes, for example, conversion of frequency data into image data by inverse DCT.

Specifically, when step S304 is performed for the first time, the bit location addr[i] and the actual direct-current component value dc[i][k] of the left-end MCU of the image are previously stored with respect to lines of i=0 to n−1 by the processing illustrated in FIG. 2. Then, in step S304, the decompressive DMAC 506 acquires the direct-current component value dc[i][k] of the left-end MCU based on the bit location addr[i]. Then, the JPEG decompressor 505 obtains actual direct-current component values dc[i][k] about MCUs other than the left-end MCUs out of p MCUs read out by the decompressive DMAC 506. Specifically, direct-current component values of MCUs (differences in direct-current component value from the left-hand side MCU) are sequentially added to the direct-current component value dc[i][k] of the left-end MCU. With this, the direct-current component values dc[i][k] of p MCUs are obtained with respect to the i-th MCU line. In step S304, the JPEG decompressor 505 further performs inverse DCT on the direct-current component values dc[i][k] and alternating-current component values of p MCUs, thus obtaining image data (pixel values) of p MCUs of the i-th MCU line.

In step S305, the JPEG decompressor 505 rotates each MCU 90 degrees as illustrated in FIG. 4B to FIG. 4C with respect to pixels values of each MCU subjected to decompression. Moreover, the decompressive DMAC 506 controls pixel output orders and outputs pixel values to the memory 510 in such a manner that MCUs are arranged as illustrated in FIG. 4D and FIG. 4E.

In step S306, as p MCUs of the i-th MCU line have been subjected to decompression processing in step S304, the decompressive DMAC 506 stores the actual direct-current component value dc[i][k] and the bit location addr[i] obtained by decompression performed in step S304.

In step S307, the JPEG decompressor 505 increments the counter i.

If, in step S308, the JPEG decompressor 505 determines that the counter i is equal to n (i=n) (YES in step S308), in other words, processing in steps S304 to S306 has been completed with respect to all of the horizontal MCU lines of the input image, the processing proceeds to step S309. If the JPEG decompressor 505 determines that the counter i is not equal to n (NO in step S308), the processing returns to step S304.

Furthermore, when the processing proceeds to step S309, decompression, rotation, and outputting to the memory 510 have previously been completed with respect to a band equivalent to p vertical MCU lines of the input compressed image. Moreover, the bit locations addr[i] and the direct-current component values dc[i][k] regarding the right-end MCU line of the p vertical MCU lines are previously stored in the JPEG decompressor 505.

In step S309, the decompressive DMAC 506 increments the counter j, thus causing processing in steps S302 to S308 to be performed with respect to a next output band. Furthermore, when step S304 is performed with respect to the next output band, a bit location addr[i] and a direct-current component value dc[i][k] corresponding to the right end of the previous output band, which was stored when step S306 was performed last time, are used.

In step S310, the JPEG decompressor 505 determines whether the counter j is greater than or equal to m/p (j≥m/p). If it is determined that j≥m/p (YES in step S310), as this indicates that rotation processing described in steps S302 to S309 has been completed with respect to the entire image plane of the input image data, the processing illustrated in FIG. 3 ends. If it is not determined that j≥m/p (NO in step S310), the processing returns to step S302, in which the decompressive DMAC 506 performs processing for a next output band.

In a case where JPEG-compressed data of an image such as that illustrated in FIG. 4A has been input to the JPEG decompressor 505, decompressed data such as that illustrated in FIG. 4E is obtained by the processing illustrated in FIG. 3. Moreover, since decoding is sequentially performed for each band corresponding to the memory B, even if the JPEG decompressor 505 or the decompressive DMAC 506 is not provided with a page memory which stores the entire image, it is possible to perform decoding on JPEG image data while rotating the JPEG image data.

However, JPEG rotation decompression processing illustrated in FIG. 2 and FIG. 3 necessitates performing a blank decode analysis in step S203 illustrated in FIG. 2. Therefore, a lot of time may be required for the analysis processing. Additionally, during JPEG decompression, each time decompression for p MCUs is performed in each MCU line of the input image, in steps S302 and S304 illustrated in FIG. 3, interrupt processing for acquiring information about a bit location and a direct-current component value at that point of time becomes necessary. Therefore, there is an issue in which, depending on the size of a memory region for a band memory, the number of times of interrupt increases and the processing speed decreases.

Therefore, in the first exemplary embodiment, with regard to orders of processing of MCUs for each of compression and decompression of an image, orders of processing different from the orders of processing described with reference to FIGS. 1A to 1D and FIGS. 4A to 4E are applied. This eliminates the necessity of a blank decode analysis and implements decompression rotation processing which is short in processing time. Additionally, compression and decompression in the first exemplary embodiment enable reducing the number of times of interrupt processing for acquiring predetermined information in both during compression and during decompression. The compression processing and decompression processing in the first exemplary embodiment are described in detail below.

Figure 5:
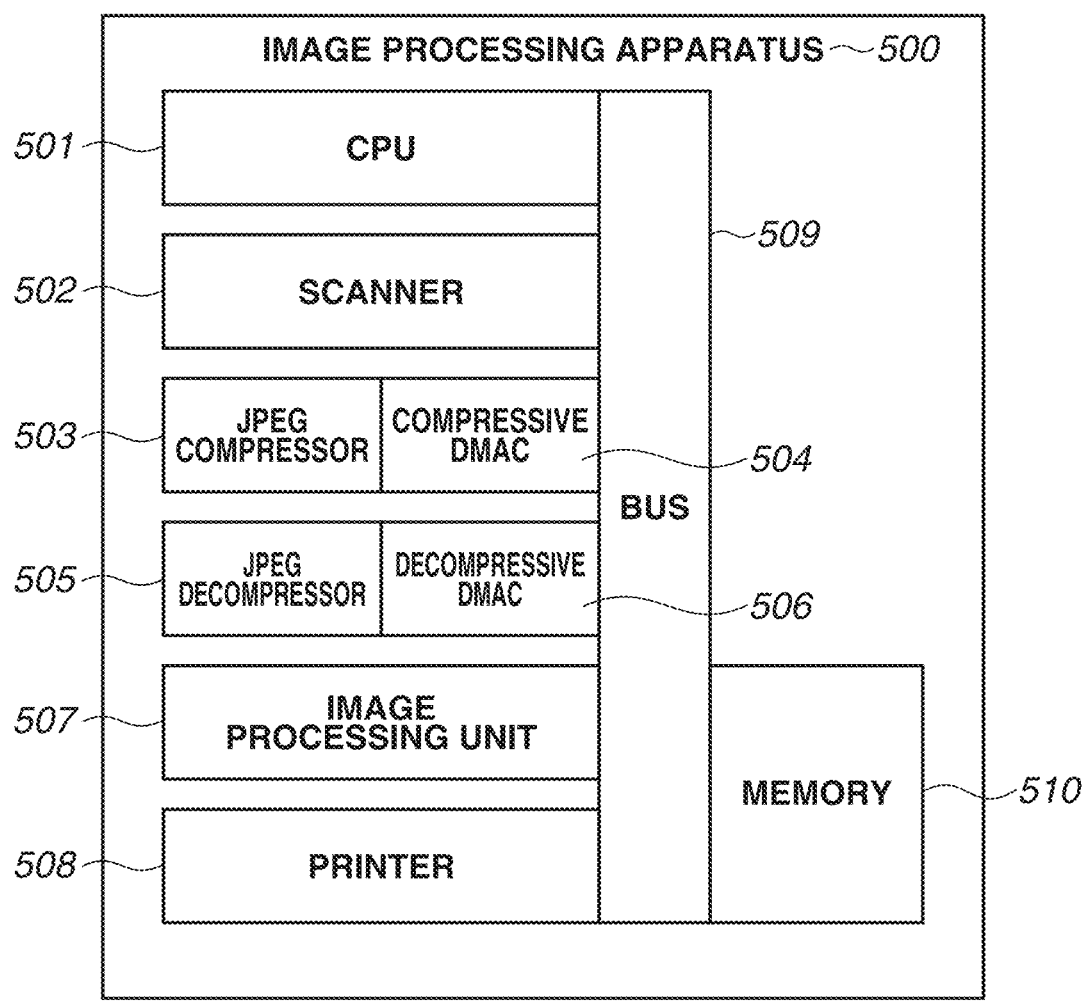
FIG. 5 is a block diagram illustrating an image processing apparatus which performs compression processing and decompression processing of an image.

FIG. 5 is a block diagram illustrating an image processing apparatus which performs compression processing and decompression processing of an image. Furthermore, in FIG. 5, an image processing apparatus 500 which includes a scanner and a printer and is capable of performing copying in addition to scanning and printing is described as an example.

A central processing unit (CPU) 501 controls the entire image processing apparatus 500. The image processing apparatus 500 includes a memory (not illustrated), such as a read-only memory (ROM), storing a control program. The CPU 501 executes the control program stored in, for example, a ROM with, for example, the memory 510 used as a work memory, thus being able to perform various control operations.

A scanner 502 scans an original to obtain RGB multivalued bitmap image data. The bitmap image data obtained by the scanner 502 is once stored in the memory 510. As described below, the bitmap image data becomes a target for compression and rotation decompression in the first exemplary embodiment. Moreover, the image processing apparatus 500 includes an interface (IF) (not illustrated) and a slot used to attach an external memory such as a memory card thereto. Then, image data received from an external apparatus via the IF or image data read out from the external memory can become a target for compression and rotation decompression in the first exemplary embodiment. The IF included in the image processing apparatus 500 includes a wireless interface used for, for example, a wireless local area network (LAN) and a wired interface used for, for example, a wired LAN or a Universal Serial Bus (USB) cord.

Furthermore, image data received from an external apparatus via the IF or image data read out from the external memory may be data compressed by usual JPEG compression such as that illustrated in FIGS. 1A to 1D. For example, the image processing apparatus 500 may perform printing of such JPEG image data. At this time, the image processing apparatus 500 may perform rotation decompression on the JPEG image data in such a manner that the JPEG image data is rotated in conformity with a print setting, such as paper size or printing orientation. In such a case, for example, the JPEG decompressor 505 and the decompressive DMAC 506 perform rotation decompression using the method illustrated in FIG. 2 and FIG. 3. Thus, since the JPEG image data is data compressed in conformity with the standard of JPEG, rotation decompression is performed by MCUs being subjected to blank decode in the order defined in consideration of such a standard.

The JPEG compressor 503, which performs JPEG compression processing on an MCU-by-MCU basis, includes, therein, a memory capable of storing image data for one MCU. The JPEG compressor 503 performs processing, such as DCT and calculation of a difference in direct-current component value such as those described above on one MCU, and storing of frequency data for one MCU.

The compressive DMAC 504 performs compression control for reading uncompressed image data from the memory 510, supplying the uncompressed image data to the JPEG compressor 503 on an MCU-by-MCU basis, and outputting JPEG image data obtained by compression performed by the JPEG compressor 503 to the memory 510.

Furthermore, the compressive DMAC 504 makes the order of MCUs on which the compressive DMAC 504 causes the JPEG compressor 503 to perform compression different according to whether to perform rotation decompression after compression of uncompressed image data. Specifically, if it is not determined to perform rotation decompression after compression, the compressive DMAC 504 causes the JPEG compressor 503 to perform compression of MCUs in the usual order in JPEG compression such as that illustrated in FIGS. 1A to 1D. Specifically, compression is performed starting with the upper left MCU toward the right-hand direction of an MCU line, and, after compression of the MCU line, compression is performed in the order from left to right with respect to an MCU line below the former MCU line by one MCU line in the vertical direction of the image. On the other hand, if it is determined to perform rotation decompression after compression, the compressive DMAC 504 causes the JPEG compressor 503 to perform compression of MCUs in the order which differs from the order illustrated in FIGS. 1A to 1D and which corresponds to the rotational angle of the image. Furthermore, whether to perform rotation decompression after compression is determined according to, for example, in a case where uncompressed image data targeted for compression is printed, a print setting in such printing. Details of the order of processing of MCUs corresponding to the rotational angle are described below.

The JPEG decompressor 505, which performs JPEG decompression processing on an MCU-by-MCU basis, includes an internal memory capable of storing image data for one MCU.

The decompressive DMAC 506 performs decompression control for reading JPEG image data from the memory 510 in the order described below, supplying the JPEG image data to the JPEG decompressor 505, and outputting uncompressed image data obtained by decompression performed by the JPEG decompressor 505 to the memory 510 in the order described below. Furthermore, the decompressive DMAC 506 has the function of writing image data included in an MCU decompressed and rotated by the JPEG decompressor 505 in the memory 510 by a write method corresponding to the rotational angle. In this way, the compressive DMAC 504 and the decompressive DMAC 506 perform JPEG compression control for compression of a JPEG image and JPEG decompression control for decompression of a JPEG image, respectively.

An image processing unit 507 performs predetermined image processing on uncompressed image data, which has been output from the decompressive DMAC 506 to the memory 510, thus outputting quantized data which is able to be output by a printer 508.

The printer 508 prints an image based on quantized data output from the image processing unit 507. A bus 509 is used to perform data transfer between the memory 510 and the respective above-mentioned blocks. The memory 510 stores results of processing performed by the respective above-mentioned blocks.

In the first exemplary embodiment, with regard to orders of processing of MCUs for each of compression and decompression of an image, orders of processing different from the usual orders of processing in JPEG processing described with reference to FIGS. 1A to 1D and FIGS. 4A to 4E are applied. Specifically, the compressive DMAC 504 and the decompressive DMAC 506 read MCUs from the memory 510 in the orders corresponding to the rotational angle of an image, and cause the JPEG compressor 503 and the JPEG decompressor 505 to perform compression and decompression, respectively.

This eliminates the necessity of a blank decode analysis and implements decompression rotation processing which is short in processing time. Additionally, compression and decompression in the first exemplary embodiment enable reducing the number of times of interrupt processing for acquiring predetermined information in both during compression and during decompression. Additionally, the JPEG compressor 503 and the JPEG decompressor 505 perform processing operations (for example, DCT and inverse DCT) similar to the usual JPEG compression and JPEG decompression, respectively. Therefore, usual processing for JPEG can also be used for compression and decompression in the first exemplary embodiment. Details of the processing in the first exemplary embodiment are described below.

Figure 6:
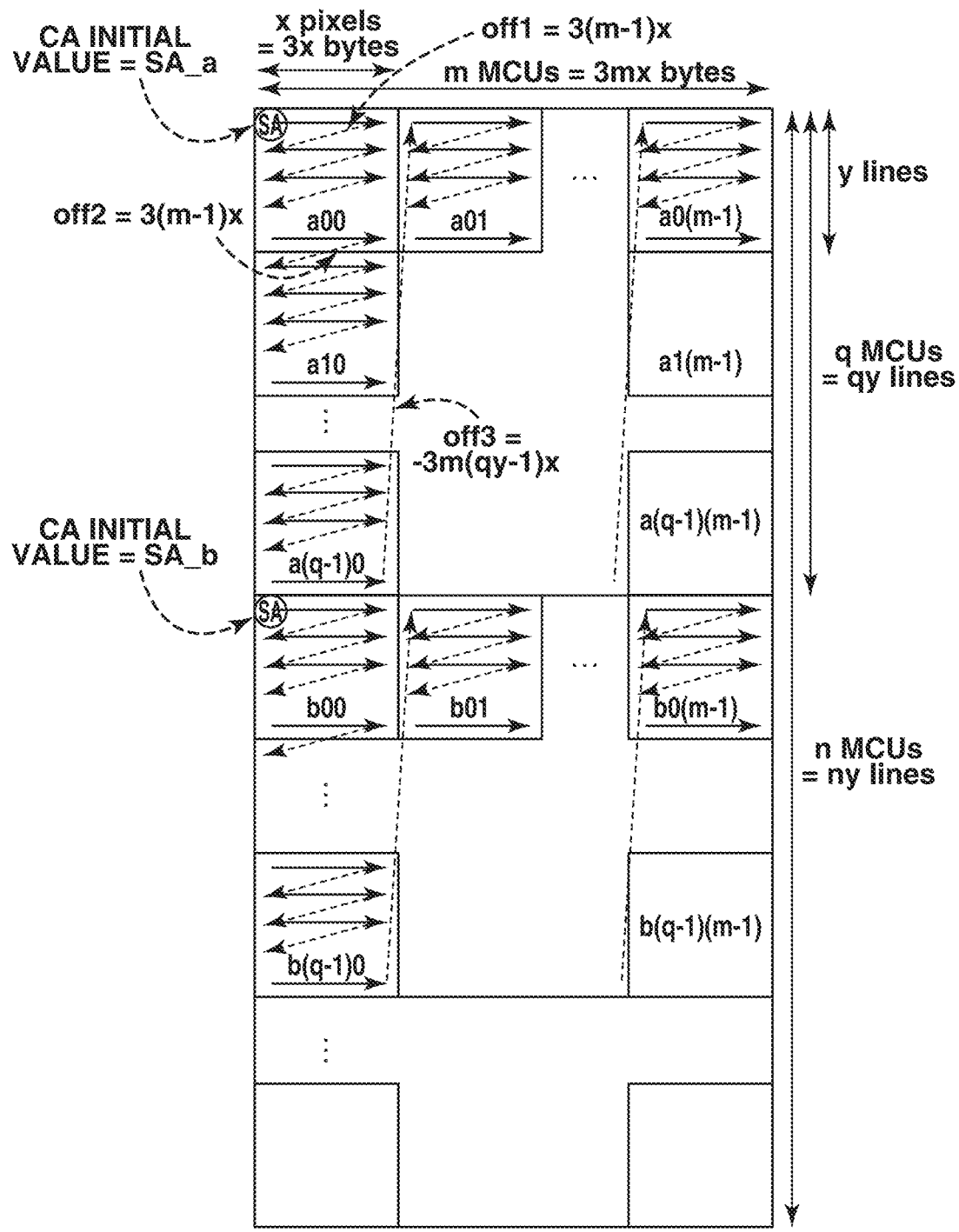
FIG. 6 is a diagram illustrating an example of orders of processing at the time of image compression accompanied by a clockwise 90-degree rotation.
Figure 7:
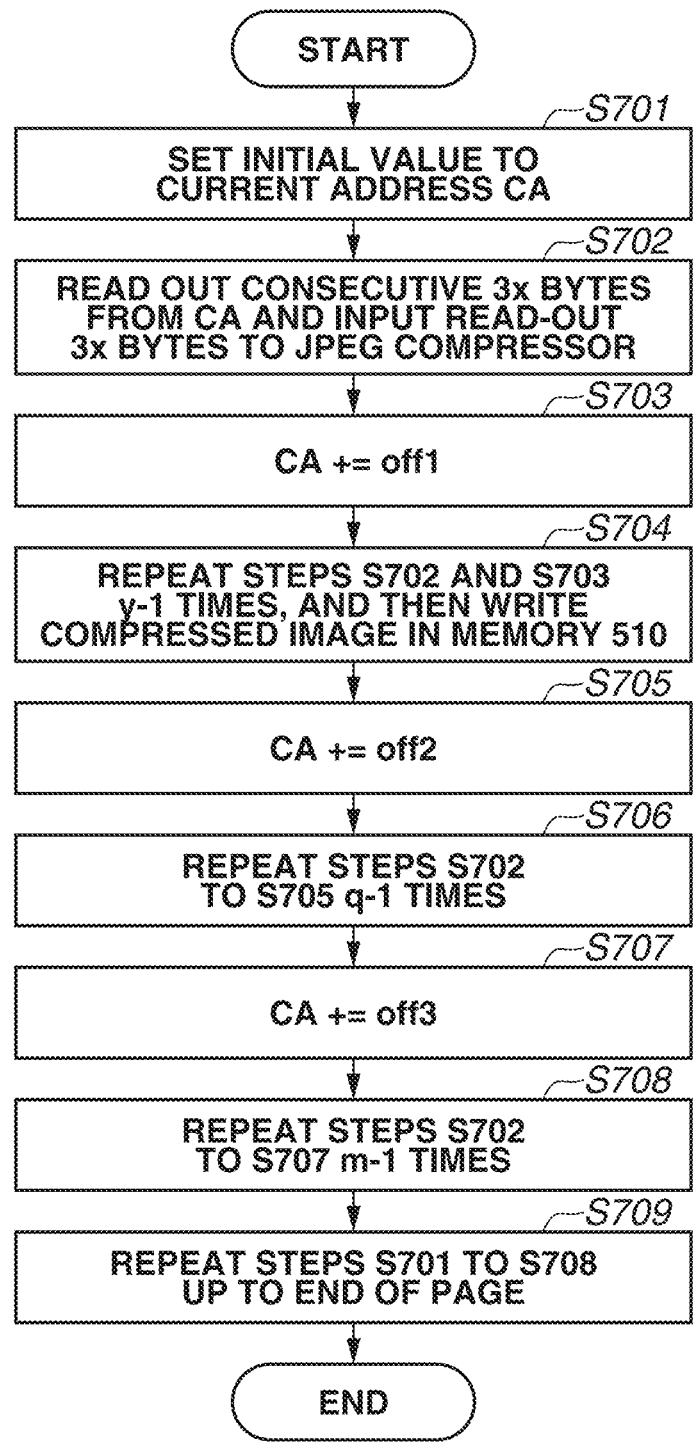
FIG. 7 is a flowchart illustrating an example of image compression processing accompanied by a clockwise 90-degree rotation.

First, an operation of the compressive DMAC 504 during image compression in the first exemplary embodiment is described with reference to FIG. 6 and FIG. 7. FIG. 6 is a diagram illustrating an example of the order of processing during image compression in the first exemplary embodiment, and FIG. 7 is a flowchart illustrating an example of image compression processing in the first exemplary embodiment. The compressive DMAC 504 reads pixel values on an MCU-by-MCU basis with respect to uncompressed image data input from the scanner 502 to the memory 510 in the raster order. Then, the compressive DMAC 504 supplies the read pixel values to the JPEG compressor 503, and sequentially outputs, into the memory 510, JPEG image data obtained by compression performed by the JPEG compressor 503 in the order of MCUs from which the pixel values are supplied.

Furthermore, in uncompressed image data which is obtained by the scanner 502 scanning an original, 8-bit data is allocated as a pixel value for each of R, G, and B (RGB). The memory 510 stores data in which such RGB pixel values are sequentially disposed starting with the start address SA. Suppose that, as illustrated in FIG. 6, the horizontal width of one MCU of an input image is x pixels, the vertical width thereof is y lines (y pixels), and the input image is composed of m MCUs in horizontal direction×n MCUs in vertical direction. At this time, the size of the input image is mx pixels in horizontal direction×ny pixels in vertical direction. In this case, the number of bytes of the pixel value of each pixel is 3 bytes because 8 bits (1 byte) is allocated to each of RGB, and the number of bytes of the horizontal width of each MCU is 3x bytes.

At the time of decompression outputting with a clockwise 90-degree rotation, the compressive DMAC 504 reads out an uncompressed image from the memory 510 on an MCU-by-MCU basis and supplies the read-out uncompressed image to the JPEG compressor 503, according to the flowchart of FIG. 7.

In step S701, the compressive DMAC 504 starts processing when the input image for q horizontal MCU lines (qy lines) or more has been read into the memory 510. Furthermore, at this time, processing is started with the address of the upper left pixel of the q horizontal MCU lines used as a current address CA=SA_a, which is the initial value of a current address indicating the current read position in the memory 510. Moreover, at this time, the compressive DMAC 504 initializes the JPEG compressor 503. In step S702, the compressive DMAC 504 reads out consecutive 3x bytes from the current address CA. Additionally, the compressive DMAC 504 inputs information about the read-out 3x bytes to the JPEG compressor 503. Moreover, the compressive DMAC 504 adds the number of read-out bytes (3x bytes) to the current address CA as appropriate.

In step S703, the compressive DMAC 504 adds a value "off1" as an offset to the current address CA obtained at that time. Here, the value "off1" is equal to 3(m−1)x (off1=3(m−1)x). As illustrated in FIG. 6, due to addition of the value "off1", the current address CA shifts to the left end of the next line in the same MCU.

In step S704, the compressive DMAC 504 repeats steps S702 and S703 y−1 times. With this processing performed y times in total, the input image data for one MCU is supplied to the JPEG compressor 503. The JPEG compressor 503 performs JPEG compression processing on the input image data for one MCU. Specifically, as with the usual JPEG compression, the JPEG compressor 503 applies DCT to image data to convert the image data into frequency data, and, with regard to direct-current components, obtains a difference value in direct-current component from the MCU subjected to compression last time. Then, the obtained difference value and an alternating-current component are stored as data about the MCU currently targeted for compression in the JPEG compressor 503. However, with regard to an MCU corresponding to the start address SA, not a difference but an actual direct-current component value is stored as a direct-current component. In step S704, the compressive DMAC 504 further stores compressed data about the MCU stored in the JPEG compressor 503 in the memory 510. However, the write position obtained at that time is a write position different from that of uncompressed data of an image currently subjected to compression. Furthermore, at that point of time, the current address CA has become the address of a pixel next to the lower right end pixel of the MCU.

In step S705, the compressive DMAC 504 adds a value "off2" to the current address CA. Here, the value "off2" is equal to 3(m−1)x (off2=3(m−1)x). As illustrated in FIG. 6, due to addition of the value "off2", the current address CA shifts to the upper left end of an MCU below the former MCU. Thus, an MCU below the MCU subjected to compression becomes a new target for read.

In step S706, the compressive DMAC 504 repeats processing in steps S702 to S705 q−1 times. With this processing performed q times in total, compression is completed with respect to q MCUs in the vertical MCU line.

In step S707, the compressive DMAC 504 adds a value "off3" to the current address CA. As illustrated in FIG. 6, due to addition of the value "off3", the current address CA shifts to the address of the upper left end of an MCU above the last MCU targeted for compression by q MCUs in a vertical MCU line on the right-hand side of the last MCU targeted for compression.

In step S708, the compressive DMAC 504 repeats processing in steps S702 to S707 m−1 times. With this processing performed m times in total, data for q horizontal MCU lines of the input image is compressed by the JPEG compressor 503, and the thus-obtained compressed image is stored in the memory 510. When processing in step S708 ends (in other words, when processing in steps S702 to S707 is repetitively performed m times), the compressive DMAC 504 once ends the processing to be performed by the JPEG compressor 503.

Furthermore, at a point of time when processing in step S708 is completed, compression processing for mx pixels in horizontal direction×qy pixels in vertical direction is completed. Therefore, at the end of step S708, a memory region in the memory 510 in which an uncompressed image for q MCU lines subjected to compression so far is stored can be deallocated.

Moreover, when processing in step S708 is completed, the compressive DMAC 504 reads out an uncompressed image for next q MCU lines from the memory 510. In a case where this uncompressed image is not present in the memory 510, the compressive DMAC 504 waits for the uncompressed image to be stored in the memory 510.

Furthermore, due to processing in steps S705 to S707 being performed, compression processing is sequentially performed on q MCUs in vertical direction and, subsequently, vertical MCUs on the right-hand side of the former MCUs are compressed in the same manner. Processing which is performed in such an order is hereinafter referred to as the "vertical MCU order".

In step S709, the compressive DMAC 504 repeats processing in steps S701 to S708 up to the end of a page. Thus, a compression target image which is a partial image for q MCU lines is sequentially changed in the input image, and, in the compression target image, MCUs are sequentially compressed in the vertical MCU order. However, in step S701, the compressive DMAC 504 initializes the JPEG compressor 503, and performs processing with the address of the upper left end pixel for q MCU lines set as the current address CA=SA_b. Furthermore, in a case where the compression target image which is input is present in a memory region continuous with the former uncompressed image for one MCU line, SA_b=CA is set. On the other hand, in a case where the compression target image has been stored in a new memory region, SA_b="start address of the new memory region" is set.

Moreover, at a point of time when processing in step S708 is completed, the calculation of a difference in direct-current component value is stopped and refreshing is performed. In other words, with regard to, for example, an MCU corresponding to the CA initial value=SA_b illustrated in FIG. 6, not a difference but an actual direct-current component value is stored.

When the above-mentioned processing in steps S701 to S708 is repeated up to the end of a page, the entire input image is input to the JPEG compressor 503, so that n/q pieces of compressed data in total are stored in the memory 510. However, these pieces of compressed data differ in the order of compressed MCUs from those illustrated in FIGS. 1A to 1D. Thus, since MCUs have been compressed in the order different from that of the usual JPEG compression, usual JPEG decompressors are not able to correctly decompress the compressed image. Therefore, in decompression processing described below, rotation decompression processing is performed on respective MCUs in the same order as the order in which MCUs have been compressed illustrated in FIG. 6.

Next, operations of the JPEG decompressor 505 and the decompressive DMAC 506 when decompressing the compressed data generated by the processing illustrated in FIG. 6 and FIG. 7 are described with reference to FIGS. 8A, 8B, 8C, and 8D and FIG. 9. FIGS. 8A to 8D are diagrams illustrating an example of the order of processing performed during image decompression accompanied by a clockwise 90-degree rotation, and FIG. 9 is a flowchart illustrating an example of image decompression processing accompanied by a clockwise 90-degree rotation.

The decompressive DMAC 506 sequentially supplies compressed data stored in the memory 510 from designated addresses to the JPEG decompressor 505. The JPEG decompressor 505 includes an internal memory capable of storing and rotating decompressed image data for one MCU. Then, the JPEG decompressor 505 performs decompression processing on compressed data for one MCU supplied via the decompressive DMAC 506, and stores the decompressed image data in the internal memory.

Then, the JPEG decompressor 505 rotates image data subjected to decompression processing and stored in the JPEG decompressor 505 by 90 degrees, and outputs the rotated image data to the decompressive DMAC 506 in the raster order in each MCU. The decompressive DMAC 506 outputs uncompressed image data output on an MCU-by-MCU basis to the memory 510.

Figure 8:
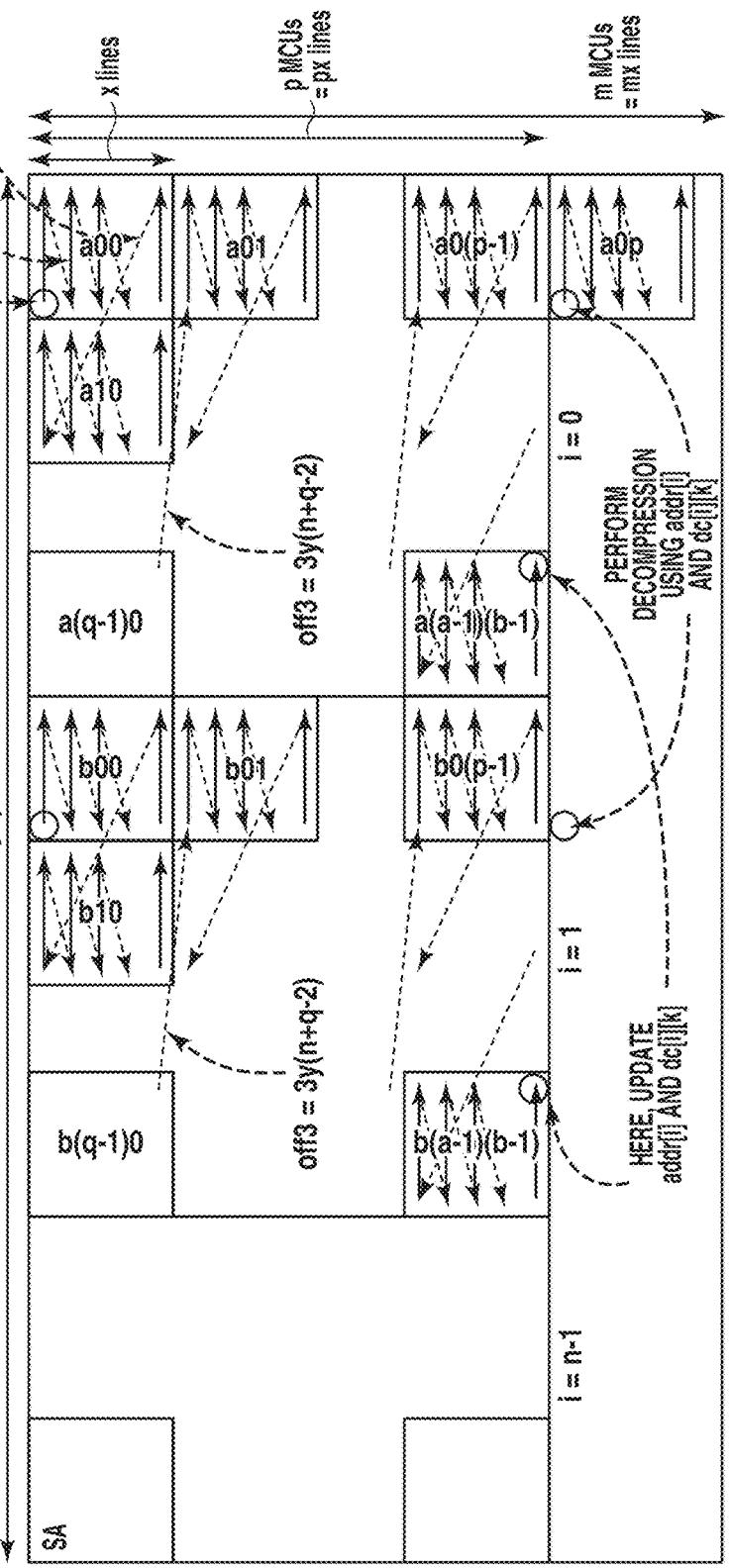
FIGS. 8A, 8B, 8C, and 8D are diagrams illustrating an example of orders of processing at the time of image decompression accompanied by a clockwise 90-degree rotation.
Figure 9:
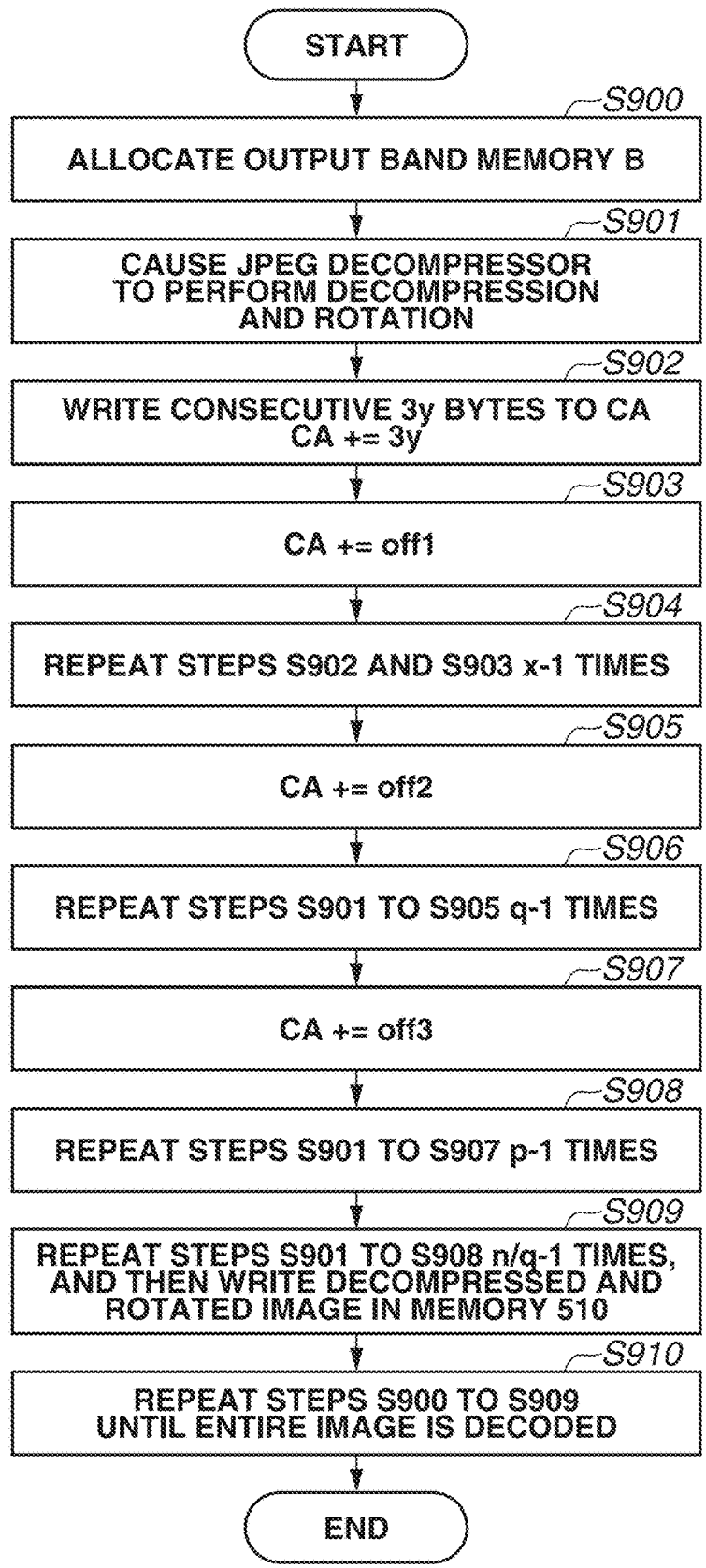
FIG. 9 is a flowchart illustrating an example of image decompression processing accompanied by a clockwise 90-degree rotation.

The JPEG decompressor 505 outputs an uncompressed image obtained by decompression to the internal memory for every MCU, as illustrated in FIG. 8A, and performs rotation thereof on the internal memory, as illustrated in FIG. 8B. Then, the JPEG decompressor 505 outputs the rotated image to the decompressive DMAC 506 in the raster order in the rotated MCU, as illustrated in FIG. 8C. Furthermore, the decompressive DMAC 506 for performing decompression processing as illustrated in FIG. 8A inputs the compressed MCU to the JPEG decompressor 505 in the same order as the order of compression of MCUs illustrated in FIG. 6. This enables the JPEG decompressor 505 to add a difference in direct-current component value included in an MCU targeted for decompression to a direct-current component value of another MCU from which the difference has been obtained.

Image data decompressed as illustrated in FIG. 8A and rotated as illustrated in FIG. 8B is stored by the decompressive DMAC 506 in the memory 510 as an image subjected to rotation compression. FIG. 9 is a flowchart illustrating processing which the decompressive DMAC 506 performs to write the rotated image in the memory 510.

In step S900, as with the processing in step S302, the decompressive DMAC 506 allocates an output band memory B with a size of $3ny \times px$ bytes (herein, p being an integer smaller than m) inside the decompressive DMAC 506, and sets the initial address thereof as a start address SA. The output band memory B is a memory region equivalent to a unit size of an image to be decompressed. The horizontal width of the unit size is $n \times y$ pixels (equivalent to n MCUs arranged side by side in horizontal direction) corresponding to the horizontal width of an image rotated 90 degrees illustrated in FIG. 8D, and the vertical height of the unit size is $p \times x$ pixels (equivalent to p MCUs arranged side by side in vertical direction). The memory size which is allocated as the output band memory B is the same as the size of the memory B in decompression processing illustrated in FIGS. 4A to 4E. Moreover, in step S900, the decompressive DMAC 506 sets an initial value to the current address CA, which indicates the current write starting position in the output band memory B. Specifically, "$SA+3(n-1)y$", which is an address equivalent to a position which has moved from the start address SA at the upper left end of the image illustrated in FIG. 8D to the right by $(n-1) \times y$ pixels, is set as the initial value of the current address CA.

In step S901, as with steps S304 and S305 illustrated in FIG. 3, the decompressive DMAC 506 inputs an MCU targeted for decompression to the JPEG decompressor 505 and causes the JPEG decompressor 505 to perform decompression and rotation as illustrated in FIGS. 8A and 8B. Such decompression and rotation to be performed by the JPEG decompressor 505 are similar to processing operations illustrated in FIG. 3 and FIGS. 4A to 4E, and the function for decompression rotation processing in FIGS. 4A to 4E can be shared. Moreover, with regard to the order of MCUs targeted for decompression to be input to the JPEG decompressor 505, the decompressive DMAC 506 inputs MCUs to the JPEG decompressor 505 in the order conforming to the order of compression illustrated in FIG. 6. Therefore, the JPEG decompressor 505 is able to appropriately decompress direct-current components of the respective MCUs.

In step S902, the decompressive DMAC 506 writes pixel values output from the JPEG decompressor 505 in the intra-MCU raster order into the output band memory B for 3y bytes continuous from the current address CA. Furthermore, this writing for 3y bytes is equivalent to writing of data for y pixels in horizontal direction of one MCU illustrated in FIG. 8D. Moreover, the number of bytes of the written data is added to the current address CA as appropriate.

In step S903, the decompressive DMAC 506 adds a value "off1" to the current address CA obtained at that time. The value "off1" is $3(n-1)y$. As illustrated in FIG. 8D, due to addition of the value "off1", the current address CA shifts to the left end of the next line in the same MCU. In step S904, the decompressive DMAC 506 repeats steps S902 and S903 x−1 times. With this processing performed x times in total, output uncompressed image data for one MCU is written in the output band memory B in the decompressive DMAC 506. At that point of time, the current address CA has become the address of a pixel next to the lower right end pixel of the MCU.

In step S905, the decompressive DMAC 506 adds a value "off2" to the current address CA. The value "off2" is $-3y((x-1)n+2)$. The current address CA shifts to the upper left end of an MCU on the left-hand side of the rotated output image, as illustrated in FIG. 8D.

In step S906, the decompressive DMAC 506 repeats processing in steps S901 to S905 q−1 times. With the processing in step S906 performed, a 90-degree rotation is performed with respect to each of q MCUs arranged side by side in vertical direction in the image illustrated in FIG. 6, and the q MCUs subjected to rotation are arranged as q MCUs from the right in the image illustrated in FIG. 8D.

In step S907, the decompressive DMAC 506 adds a value "off3" to the current address CA. The value "off3" is 3y(n+q−2). Due to addition of the value "off3", the current address CA shifts to the upper left pixel of an MCU which is on the right-hand side of the MCU data about which has been written in the memory 510 last time across q−1 MCUs and which is below the last MCU by one MCU line, in the image illustrated in FIG. 8D.

In step S908, the decompressive DMAC 506 repeats processing in steps S901 to S907 p−1 times. With this processing performed p times in total, data about each of p MCUs in horizontal direction×q MCUs in vertical direction in the data illustrated in FIG. 6 is decompressed and rotated 90 degrees by the JPEG decompressor 505. Then, the decompressed and rotated image is written in the output band memory B included in the decompressive DMAC 506. In such writing, as illustrated in FIG. 8D, an image rotated 90 degrees is written as q MCUs in horizontal direction×p MCUs in vertical direction. Furthermore, after processing in steps S901 to S907 is performed p times in total, the decompressive DMAC 506 updates the bit location addr[i] and the direct-current component value dc[i][k] (k=0, 1, 2) in the i-th MCU of the input image targeted for decompression last time. These values are used for processing to be performed in a next output band.

In step S909, the decompressive DMAC 506 repeats processing in steps S901 to S908 n/q−1 times. Thus, the decompressive DMAC 506 repeats processing in steps S901 to S908 while changing q MCUs×p MCUs serving as a decompression target portion of the compressed image. With this processing, a decompressed and rotated image with a horizontal width of n pixels×y pixels (equivalent to n MCUs arranged side by side in horizontal direction) and a vertical height of p pixels×x pixels (equivalent to p MCUs arranged side by side in vertical direction) as illustrated in FIG. 8D is stored in the output band memory included in the decompressive DMAC 506. Then, in step S909, the decompressive DMAC 506 further outputs an image stored in the output band memory to the memory 510. Thus, compressed data about a vertical band equivalent to p vertical MCU lines in the compressed image illustrated in FIG. 6 has been decompressed and rotated and the decompressed and rotated data has been stored in the memory 510.

In step S910, the decompressive DMAC 506 repeats processing in steps S900 to S909 until the entire image is decoded. Specifically, processing in steps S900 to S909 is repeated m/p−1 times. Furthermore, each time processing in step S909 is performed and an image stored in the output band memory B is output to the memory 510, the decompressive DMAC 506 deletes such an output image from the output band memory B. This enables performing decompression and rotation of the entire compressed input image with use of the band memory B (3pnxy bytes), which is smaller in memory capacitance than a page memory (3mnxy bytes) capable of storing an input image in an uncompressed manner.

Furthermore, in the second and subsequent rounds of processing in a loop performed by step S909, with regard to a direct-current component of an MCU which is first decompressed in step S901, a difference value from the direct-current component value of another MCU is stored. Specifically, in the image illustrated in FIG. 8D, a difference value from the direct-current component value of an MCU located on the left-hand side of the MCU which is first decompressed in step S901 by q−1 MCUs and above such an MCU by one MCU is stored.

Therefore, the decompressive DMAC 506 reads out a bit location addr[i] and a direct-current component value dc[i][k] (k=0, 1, 2) previously stored in the JPEG decompressor 505 when rotation decompression was performed last time with respect to the band memory B, and inputs the bit location addr[i] and the direct-current component value dc[i][k] (k=0, 1, 2) to the JPEG decompressor 505. Therefore, it is possible to obtain an appropriate direct-current component value with respect to an MCU which is decompressed first in step S901.

As mentioned above, in the first exemplary embodiment, first, when an input image is compressed by the JPEG compressor 503, the input image is divided by the compressive DMAC 504 into a plurality of pieces of image data each of which includes q MCU lines. Then, in the case of a 90-degree rotation, control is performed by the compressive DMAC 504 in such a manner that, with respect to each piece of image data obtained by division, MCUs are compressed by the JPEG compressor 503 starting with the upper left MCU toward the lower side. Then, during decompression accompanied by a 90-degree rotation, the decompressive DMAC 506 causes the JPEG decompressor 505 to decompress MCUs in the order corresponding to the above-mentioned order of compression, and then writes the decompressed image in the memory 510 according to the writing order and address corresponding to the 90-degree rotation.

At that time, in the first exemplary embodiment, in a case where compression and decompression accompanied by a rotation are performed on an image, control is performed in such a manner that the order of MCUs which are compressed and the order of MCUs which are decompressed are the same. Therefore, since a blank decode analysis, which has been described with reference to FIGS. 4A to 4E, becomes unnecessary, higher-speed image compression and decompression become possible. Moreover, in the example illustrated in FIGS. 4A to 4E, even with respect to interrupt processing which occurs (m/p)×n times to update a bit location and a direct-current component value for each MCU line, performing the above-described processing enables reducing the number of times of processing. Specifically, performing decompression for every pq MCUs starting with the beginning of each image as in step S908 illustrated in FIG. 9 enables setting the number of times of interrupt to "(m/p)×(n/q)", in other words, enables reducing the number of times of interrupt to 1/q of that of the example illustrated in FIGS. 4A to 4E. Therefore, it is possible to greatly reduce a processing time for interrupt processing and thus significantly speed up the entire processing.

The above-described processing eliminates the need for a blank decode analysis and implements high-speed image compression processing and image decompression processing with the number of times of interrupt processing reduced.

Additionally, even the first exemplary embodiment uses processing operations similar to those in usual JPEG image processing, such as DCT and calculation of a difference in direct-current component value between MCUs which are performed by the JPEG compressor 503 and DCT and calculation of an actual direct-current component value of each MCU which are performed by the JPEG decompressor 505. In other words, while, in the first exemplary embodiment, the order of compression and the order of decompression of MCUs are different from those in usual JPEG image processing due to control operations performed by the compressive DMAC 504 and the decompressive DMAC 506, processing to be performed on each MCU is similar to that in usual JPEG image processing. Therefore, unless a specific compressor or decompressor different from the JPEG compressor 503 or the JPEG decompressor 505 is prepared for compression or decompression in the first exemplary embodiment, the above-described high-speed image compression and image decompression are able to be performed.

In the above-described first exemplary embodiment, the case of, along with compression and decompression of an image, rotating the image 90 degrees clockwise has been described. In a second exemplary embodiment described below, the case of, along with compression and decompression of an image, rotating the image 270 degrees clockwise (rotating the image 90 degrees counterclockwise) is described.

As described in the first exemplary embodiment, in the case of rotating an image 90 degrees clockwise, an image for q vertical MCU lines of the input image becomes a unit of compression, and, in the image for q vertical MCU lines, compression is performed in the order of vertical MCUs. Then, in decompression processing in the case of a clockwise 90-degree rotation, as illustrated in FIG. 8D, decompression is performed with an image unit i equivalent to p×q MCUs, and, in the image unit i, MCUs are subjected to decompression in the same order as that employed during compression. Then, in processing of the i-th image unit in the j-th output band, an address value and a direct-current component value which have been recorded in step S908 are able to be used in decompression processing of the i-th image unit in the (j+1)-th output band.

However, at the time of a 270-degree rotation, if processing performed at the time of compression is made the same as that at the time of a 90-degree rotation, processing performed on an MC U-by-MCU basis during decompression becomes reverse to that performed at the time of a 90-degree rotation. Therefore, there is an issue in which an address value and a direct-current component value which are used at the time of decompression in the j-th output band are not able to be obtained by processing performed in the prior output band. The second exemplary embodiment solves this issue by, during compression, performing compression in the vertical MCU order "from the right" of an input image. However, a rotational direction at the time of decompression is needed to be previously known before compression is performed.

FIG. 10 and FIGS. 11A, 11B, 11C, and 11D are diagrams illustrating the orders of processing for JPEG compression and decompression processing accompanied by a clockwise 270-degree rotation, respectively. The configuration of an image processing apparatus in the second exemplary embodiment is similar to that in the first exemplary embodiment, but differs therefrom in rotating image data 270 degrees. In the following description, operations of the JPEG compressor 503 and the compressive DMAC 504 and operations of the JPEG decompressor 505 and the decompressive DMAC 506 which are performed when, along with compression and decompression of an image, the image is rotated 270 degrees clockwise are described.

First, an operation of the compressive DMAC 504 performed at the time of decompression outputting with a clockwise 270-degree rotation is described with reference to FIG. 10. However, the processing flow at the time of decompression outputting with a clockwise 270-degree rotation is the same as the processing flow in a case where an image is rotated 90 degrees illustrated in FIG. 7, but differs therefrom in setting values which are used for processing. Specifically, an initial value of the current address CA and an offset value for changing the address of data targeted for processing are set in such a manner that MCUs are compressed in the order illustrated in FIG. 10.

In step S701, the compressive DMAC 504 sets "SA_a" as the current address CA. When the upper left end of an image is set as SA, "SA_a" is SA_a=SA+3(m−1)x, and this address corresponds to the upper left pixel in the upper right MCU of the image, as illustrated in FIG. 10. Then, data for one line in the MCU is read out by the processing in step S702. "3(m−1)x" is used as "off1" which is an offset to be used in processing in step S703. The address of data which is read out by the compressive DMAC 504 shifts to an address corresponding to the left-end pixel of a line just below the former line in the MCU due to the processing in step S703. Then, when steps S702 and S703 are further repeated y−1 times by the processing in step S704, compression of one MCU is completed.

"3(m−1)x", which is the same as "off1", is used as "off2" which is an offset to be used in processing in step S705. The address of data which is read out shifts to an address corresponding to the upper left pixel in an MCU just below the former MCU in the image due to the processing in step S705.

When steps S702 to S705 are further repeated q−1 times by the processing in step S706, compression is completed with respect to q MCUs arranged side by side in vertical direction.

"3x(m-2-yqm)" is used as "off3" which is an offset to be used in processing in step S707. The MCU targeted for compression shifts to an MCU located on the left-hand side of the former MCU by one MCU and above the former MCU by q−1 MCUs due to the processing in step S707. Additionally, the address targeted for readout shifts to an address corresponding to the upper left pixel of the MCU newly targeted for compression.

Figure 10:
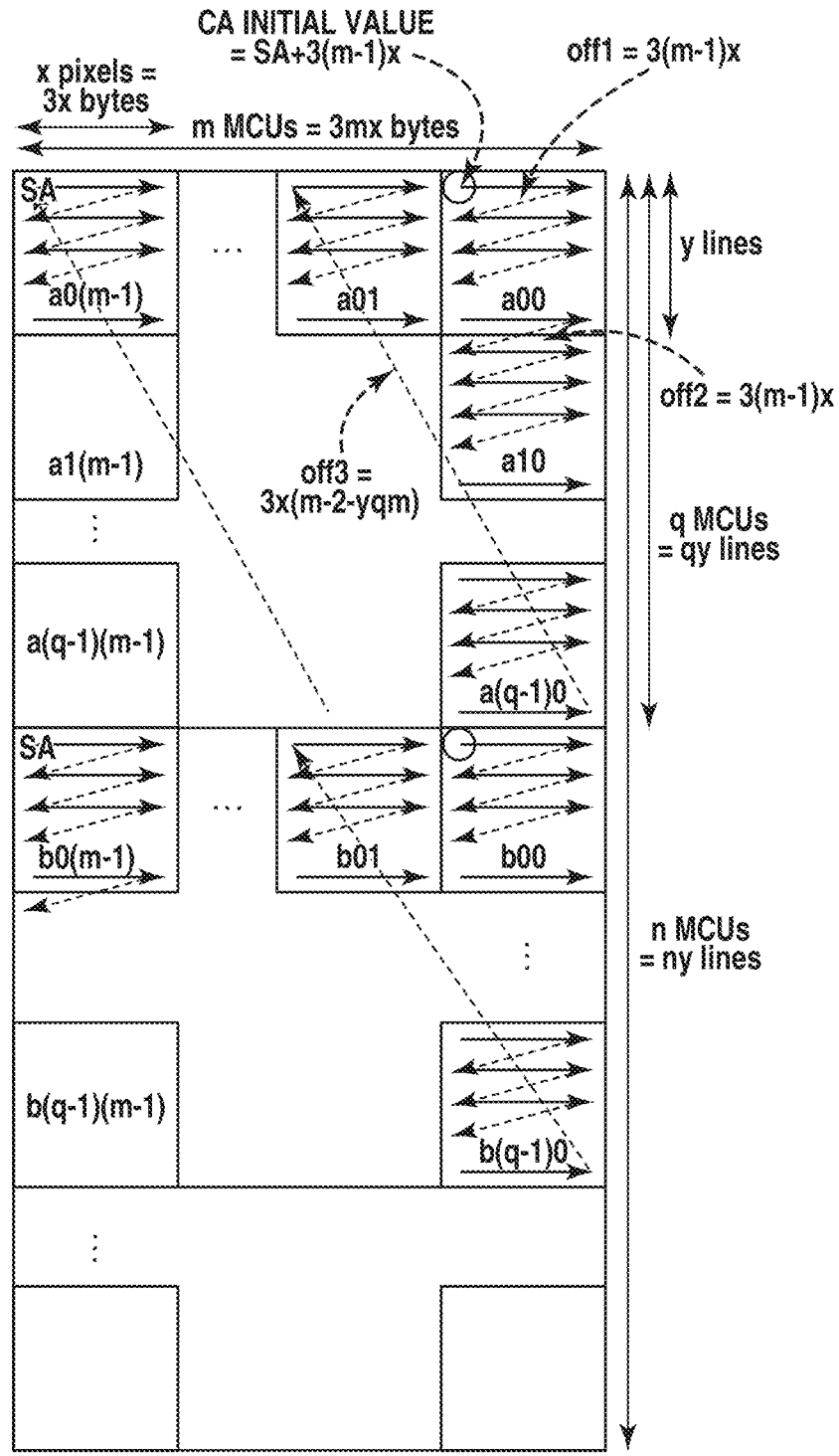
FIG. 10 is a diagram illustrating an example of orders of processing at the time of image compression accompanied by a clockwise 270-degree rotation.

MCUs are sequentially compressed in the order illustrated in FIG. 10 by the processing in steps S708 and S709. With this processing, the entire input image is input to the JPEG compressor 503, so that n/q pieces (here, n≥q, and, in a case where n is not devisable by q, +1 piece) of JPEG image data in total are generated. However, with regard to these pieces of JPEG image data, while each MCU is compressed by the processing similar to that in the usual JPEG processing, the order of compression of MCUs differs from that in the usual JPEG processing.

Moreover, as with the time of compression processing, a flow for performing decompression processing accompanied by a clockwise 270-degree rotation is also the same as that for performing decompression processing accompanied by a clockwise 90-degree rotation described with reference to FIG. 9, except that setting values are different. Specifically, various setting values used for processing at the time of a clockwise 270-degree rotation are as follows.

Initial value of CA=SA $\mathit{off1} = 3(n-1)y$ $\mathit{off2} = -3n(x-1)y$ $\mathit{off3} = 3y(n-q)$ As the flow illustrated in FIG. 9 is performed using the above-mentioned setting values, as illustrated in FIGS. 11A to 11D, the image illustrated in FIG. 10 is decompressed in the state of being rotated 270 degrees clockwise (90 degrees counterclockwise). The order in which decompression is performed on MCUs included in the image illustrated in FIG. 10 is the same as the order in which compression has been performed thereon. Moreover, writing positions in the memory 510 in which pieces of decompressed data are written in the memory 510 are specifically as follows. First, the initial value of a CA, which indicates a writing destination address for writing data in the memory 510, is set to an address (SA) corresponding to the upper left pixel in an image subjected to a clockwise 270-degree rotation. Then, decompression and writing are performed from the upper left pixel of the rotated MCU toward the right, and, due to "off1", the writing position shifts to a line below the former line in the MCU. After such decompression and writing are performed on the entire MCU, due to "off2", the writing position shifts to an address corresponding to the upper left pixel of an MCU on the right-hand side of the former MCU. When these processing operations are performed on q MCUs arranged side by side in horizontal direction, due to "off3", the writing position shifts to an address corresponds to the upper left pixel of an MCU located on the left side of the last decompressed MCU by q−1 MCUs and below such an MCU by one MCU. When the above-mentioned processing operations are repeated by p MCU lines in vertical direction, decompression with a clockwise 270-degree rotation is completed with respect to q×p MCUs. Then, when the above-described processing operations are performed on the entire image subjected to rotation while the initial value of the CA is being changed, decompression processing with the image illustrated in FIG. 10 rotated 270 degrees clockwise is completed. Therefore, performing the same processing as that for a clockwise 90-degree rotation (the processing illustrated in FIG. 9) while setting different setting values enables performing a clockwise 270-degree rotation. Therefore, as with decompression processing accompanied by a clockwise 90-degree rotation, decompression processing accompanied by a clockwise 270-degree rotation also does not need a blank decode analysis, so that high-speed processing with the number of times of interrupt processing reduced can be implemented.

Figure 15:
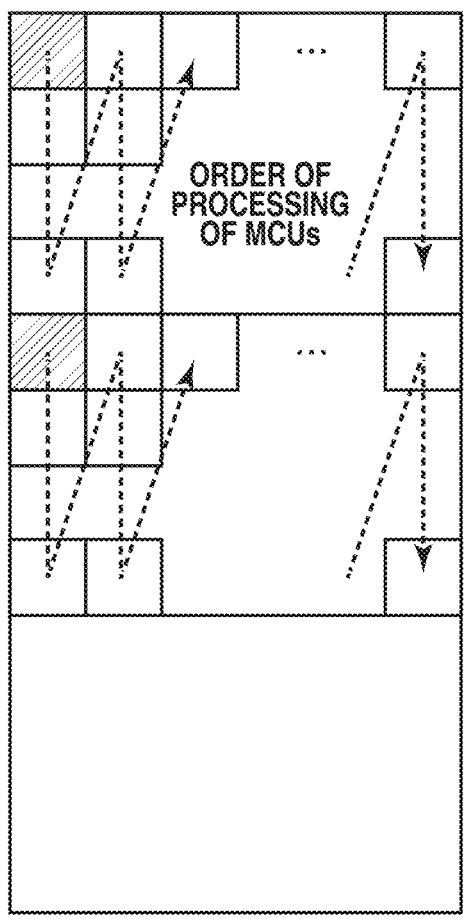
FIG. 15 is a diagram illustrating orders of compression processing of MCUs described in a first exemplary embodiment.
Figure 16:
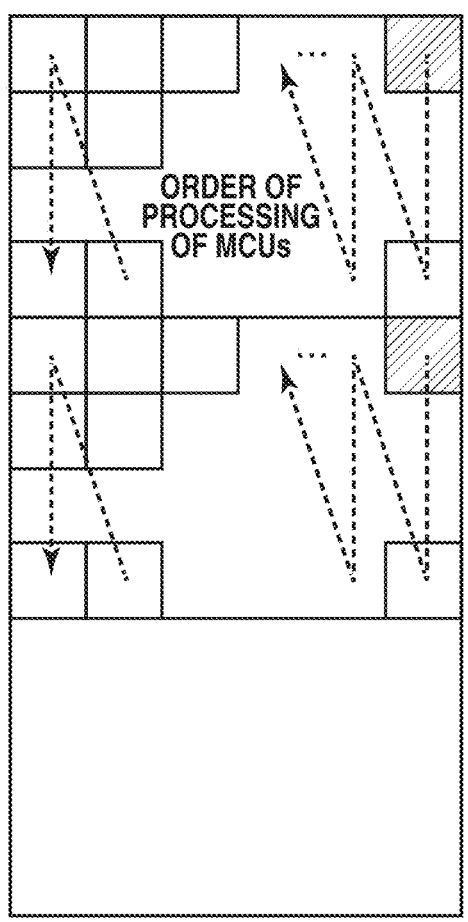
FIG. 16 is a diagram illustrating orders of compression processing of MCUs described in a second exemplary embodiment.

Furthermore, FIG. 15 is a diagram illustrating the order of compression processing of MCUs described in the first exemplary embodiment, and FIG. 16 is a diagram illustrating the order of compression processing of MCUs described in the second exemplary embodiment. Then, decompression is performed according to the order of decompression corresponding to each of the orders of compression illustrated in FIG. 15 and FIG. 16. In this way, MCUs are compressed in an order corresponding to the rotational angle of an image and decompression processing is performed in an order corresponding to the order of compression, so that it is possible to eliminate the need for blank decode.

Figure 12:
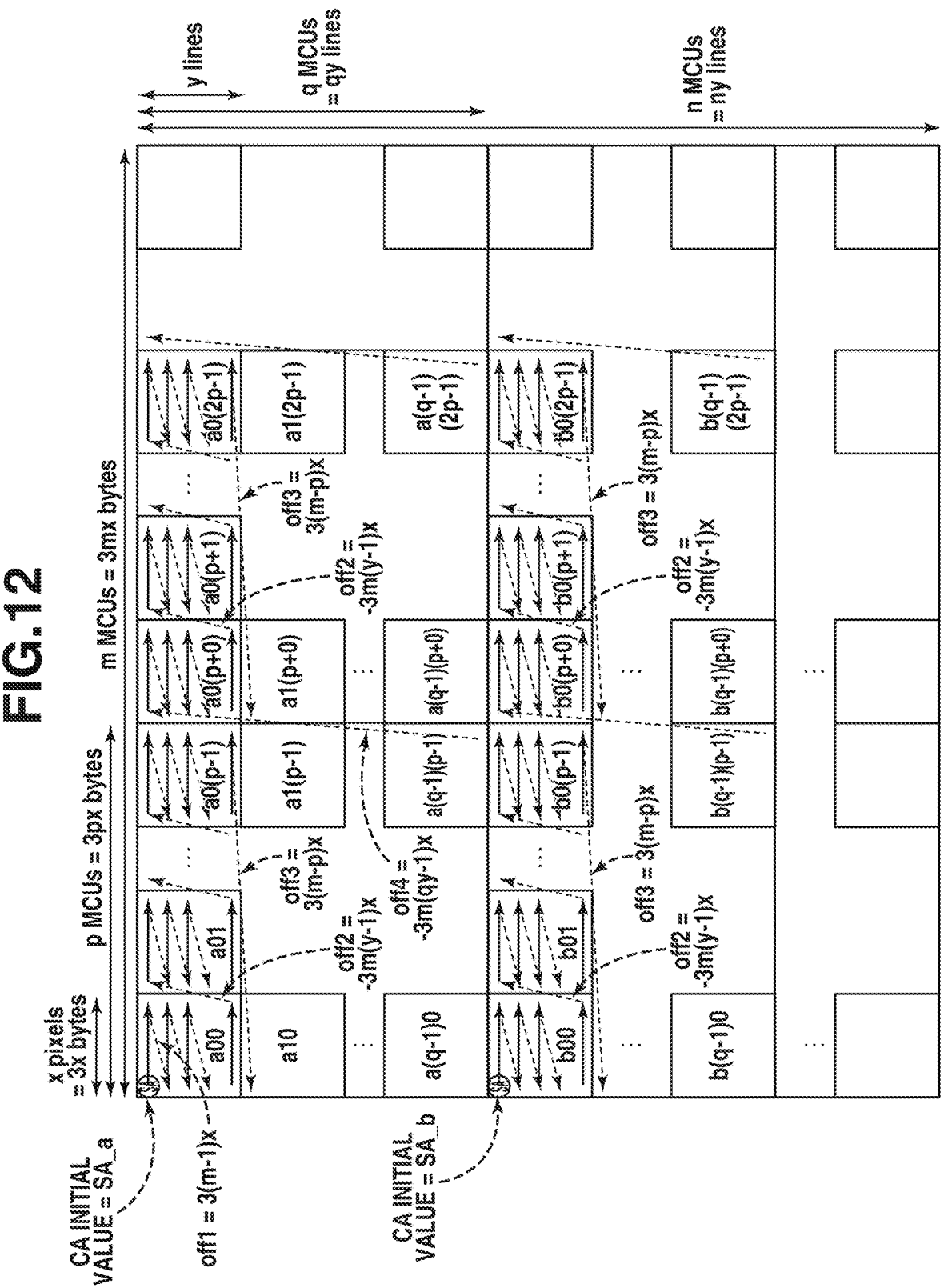
FIG. 12 is a diagram illustrating another example of orders of processing at the time of image compression accompanied by a clockwise 90-degree rotation.
Figure 13:
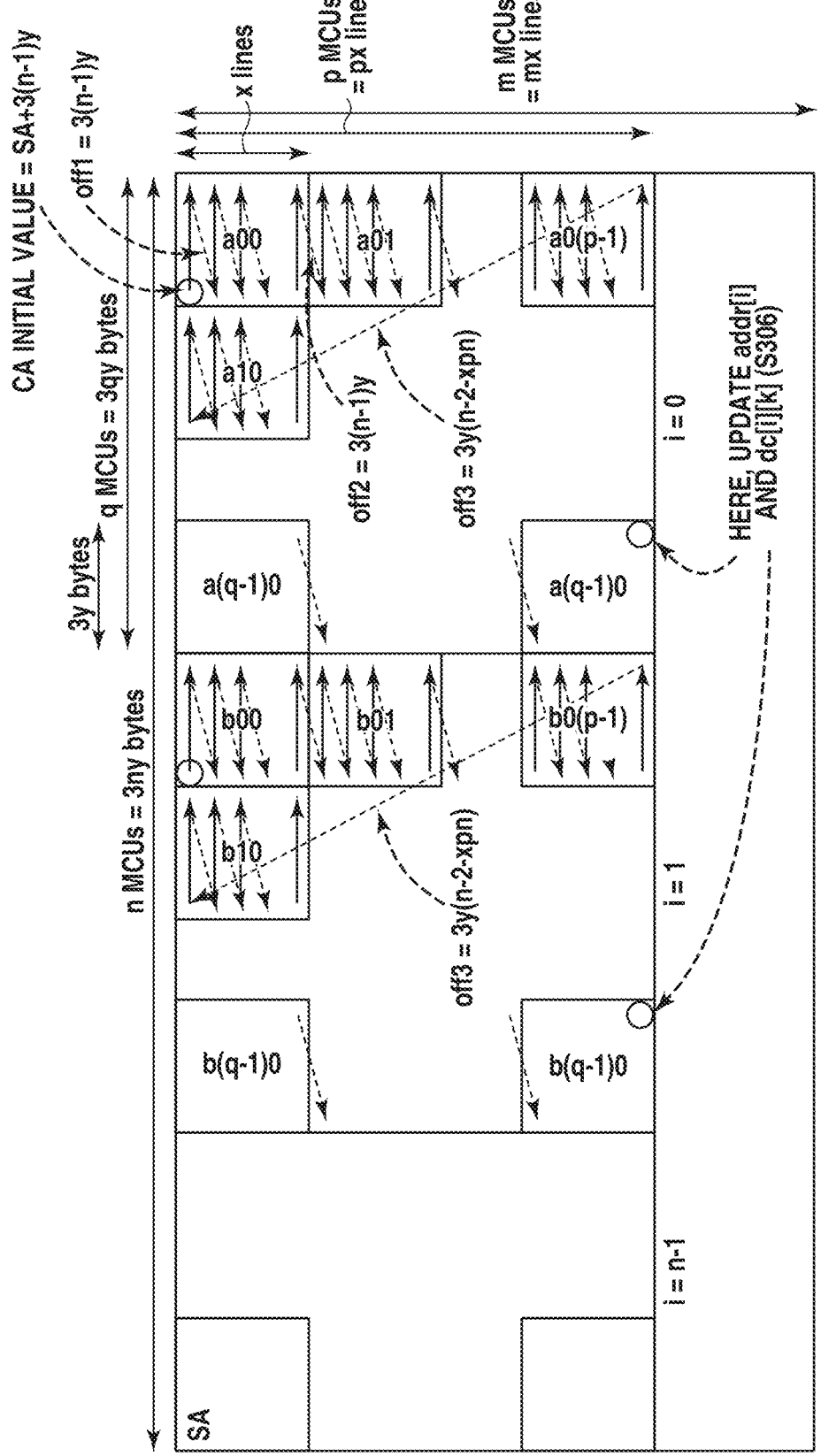
FIG. 13 is a diagram illustrating another example of orders of processing at the time of image decompression accompanied by a clockwise 90-degree rotation.

FIG. 12 and FIG. 13 are diagrams illustrating other examples of JPEG compression processing and decompression processing accompanied by a clockwise 90-degree rotation, respectively, according to a third exemplary embodiment. Although the third exemplary embodiment relates to a method accompanied by a clockwise 90-degree rotation as with the first exemplary embodiment, while, in the first exemplary embodiment, the order of compression of input image data is the vertical MCU order, in the third exemplary embodiment, compression processing is performed in an order taken along horizontal lines of MCUs.

In the following description, operations of the JPEG compressor 503 and the compressive DMAC 504 and operations of the JPEG decompressor 505 and the decompressive DMAC 506 in the third exemplary embodiment are described.

Figure 14:
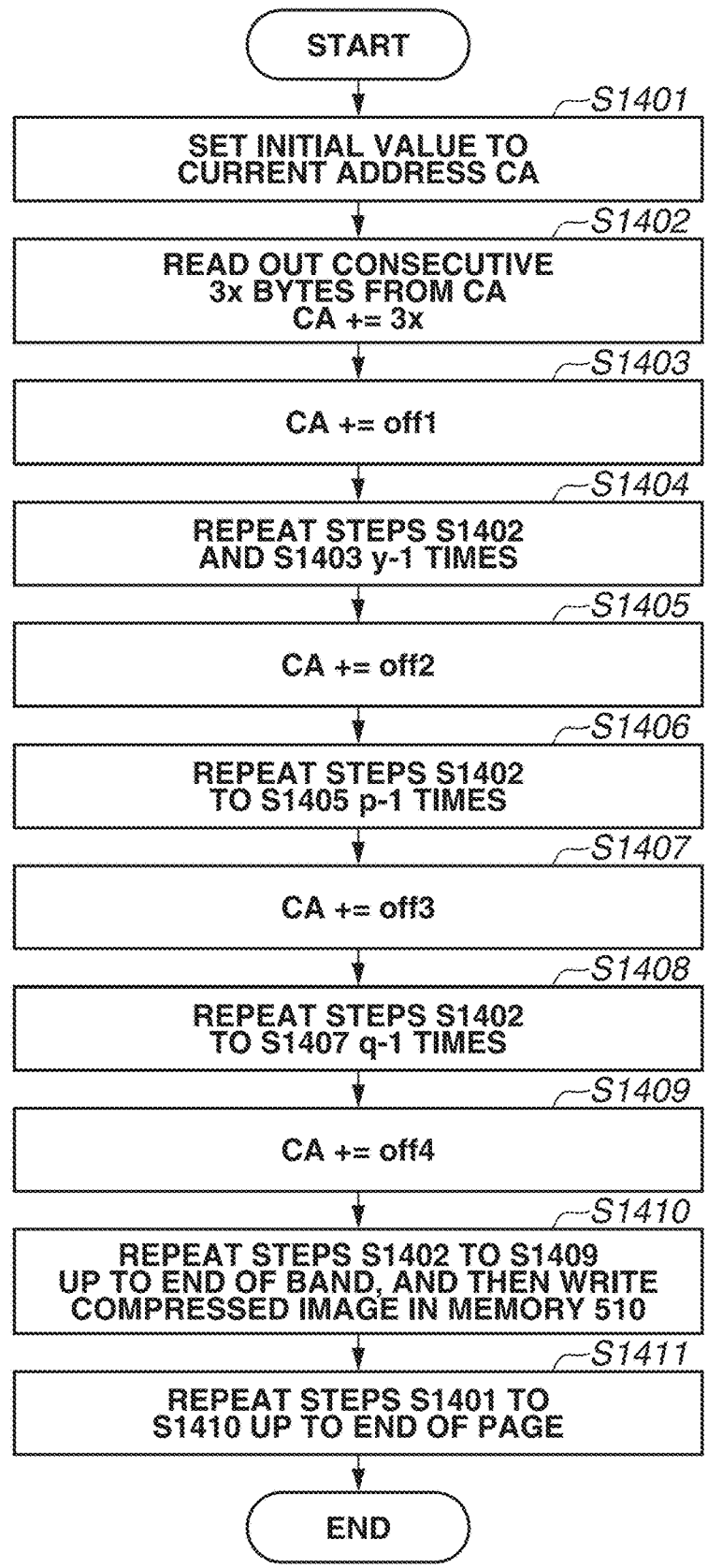
FIG. 14 is a flowchart illustrating another example of image decompression processing accompanied by a clockwise 90-degree rotation.

FIG. 14 is a flowchart illustrating processing which is performed by the JPEG compressor 503 and the compressive DMAC 504, and also illustrating another example of image decompression processing accompanied by a clockwise 90-degree rotation.

In step S1401, the compressive DMAC 504 sets "SA_a" illustrated in FIG. 12 as a current address CA. In step S1402, the compressive DMAC 504 reads out consecutive 3× bytes from the current address CA. The number of bytes which have been read out is added to the CA as appropriate. In step S1403, the compressive DMAC 504 adds a value "off1" to the current address CA obtained at that point of time. Here, the value "off1" is equal to 3(m−1)x (off1=3(m−1)x). As illustrated in FIG. 12, due to addition of the value "off1", the current address CA shifts to the left end of the next line in the same MCU. In step S1404, the compressive DMAC 504 repeats steps S1402 and S1403 y−1 times. With this processing performed y times in total, the input image data for one MCU is supplied to the JPEG compressor 503. The JPEG compressor 503 continuously performs JPEG compression processing on the input MCU. At that point of time, the current address CA becomes the address of a pixel next to the lower right end pixel of the MCU.

In step S1405, the compressive DMAC 504 adds a value "off2" to the current address CA. Here, the value "off2" is equal to −3m(y−1)x (off2=−3m(y−1)x). Due to addition of the value "off2", the current address CA shifts to the upper left end of an MCU on the right-hand side of the former MCU, as illustrated in FIG. 12. In step S1406, the compressive DMAC 504 repeats processing in steps S1402 to S1405 p−1 times. With this processing performed p times in total, compression processing is completed with respect to p MCUs arranged side by side in horizontal direction. In step S1407, the compressive DMAC 504 adds a value "off3" to the current address CA. Due to addition of the value "off3", as illustrated in FIG. 12, the current address CA shifts to the upper left end of a beginning MCU in a horizontal MCU line below the former MCU line by one MCU line. Furthermore, the value "off3" is 3(m−p)x.

In step S1408, the compressive DMAC 504 repeats processing in steps S1402 to S1407 q−1 times. With this processing performed q times in total, data equivalent to p×q MCUs of the input image is input to the JPEG compressor 503 and is then stored in the band memory included in the compressive DMAC 504.

In step S1409, the compressive DMAC 504 adds a value "off4" to the current address CA. Due to addition of the value "off4", as illustrated in FIG. 12, the current address CA becomes the address of the upper left pixel of an MCU located above the former MCU by q−1 MCUs in a vertical MCU line on the right-hand side of the former vertical MCU line.

In step S1410, the compressive DMAC 504 repeats processing in steps S1402 to S1409 up to the end of the band. With the above-mentioned processing performed, an image for q horizontal MCU lines compressed up to this step is compressed and is then stored in the band memory included in the compressive DMAC 504. Then, the compressive DMAC 504 stores an image stored in the band memory in the memory 510. At this time, the compressive DMAC 504 can deallocate the band memory. Here, in a case where an uncompressed image in a next MCU line is not present in the memory 510, the compressive DMAC 504 waits for the uncompressed image to be stored in the memory 510.

In step S1411, the compressive DMAC 504 repeats processing in steps S1401 to S1410 until these processing operations are performed on the entire image. More specifically, the compressive DMAC 504 performs processing in steps S1401 to S1410 on the entire image by sequentially changing the current address CA downward for q lines as indicated by "SA_b" illustrated in FIG. 12. With this processing, the entire input image is compressed by the JPEG compressor 503. Thus, as with the second exemplary embodiment, n/q compressed images (here, n≥q, and, in a case where n is not devisable by q, +1 image) are generated, and the generated compressed images are stored in the memory 510.

Decompression processing which is performed in the third exemplary embodiment is the processing illustrated in FIG. 9. However, setting values used for the decompression processing are different from those used at the time of a clockwise 90-degree rotation in the first exemplary embodiment. Various setting values in the third exemplary embodiment are as follows.

Initial value of CA=SA+3($n-1$)$y$ $off1=3(n-1)y$ $off2=3(n-1)y$ $off3=3y(n-2-xpn)$ As the processing illustrated in FIG. 9 is performed using these setting values, decompressed data is written in the memory 510 according to the order illustrated in FIG. 13. Accordingly, an image compressed as illustrated in FIG. 12 is rotated 90 degrees clockwise and then written in the memory 510 as illustrated in FIG. 13.

According to the processing described in the third exemplary embodiment, even if the order of compression of input image data is not the vertical MCU order, compression processing and decompression processing accompanied by a rotation of an image can be implemented without the need to perform a blank decode analysis and with the number of times of interrupt processing reduced.

As described above, in the above-described exemplary embodiments, processing to be performed in the case of performing decompression in such a way as to rotate a compressed image and not decompressing the entire image at one time but dividing the image into MCUs and performing decompression in a divisional manner has been described. In this processing, in a case where the compressed image is an image in which MCUs have been sequentially compressed according to the order used in the usual JPEG compression as illustrated in FIGS. 1A to 1D, blank decode is needed to obtain direct-current component values of some MCUs targeted for decompression.

Therefore, in the above-described exemplary embodiments, in the case of, when compressing and decompressing an image, rotating the image, the order different from that in the usual JPEG processing and corresponding to the rotational angle is applied as the order in which, during compression of the image, compression processing is sequentially performed on MCUs. Then, with regard to an image compressed in such a way, MCUs are sequentially decompressed and rotated in the order corresponding to the order of compression, and then, the MCUs are sequentially written in the memory according to the order corresponding to the rotational angle. Therefore, without the need to perform blank decode, an image is able to be rotated in compression and decompression processing of the image.

However, since data compressed by compression processing illustrated in FIG. 6, FIG. 10, or FIG. 12 is data in which MCUs have been compressed in the order different from that in the usual JPEG processing, it may be conceivable that, for example, a usual JPEG decoder included in an external apparatus is not able to decompress such data. Therefore, for example, compression processing in the above-described exemplary embodiments is performed in a situation in which it is determined that decompression is performed by the image processing apparatus 500. For example, in a case where copying is performed by the printer 508 printing a scanned image obtained by the scanner 502 scanning an original, compression processing in the above-described exemplary embodiments is performed. Specifically, the JPEG compressor 503 compresses the scanned image, the JPEG decompressor 505 decompresses the compressed scanned image, and the printer 508 prints the decompressed image. In this case, depending on copy settings (for example, duplex (two-sided) copy setting and page multiple-up such as N-in-1), the need to rotate the image 90 degrees or 270 degrees clockwise may arise. At this time, compression processing illustrated in FIG. 6, FIG. 10, or FIG. 12 is applied to compression of a scanned image which is performed by the JPEG compressor 503, and decompression processing illustrated in FIGS. 8A to 8D, FIGS. 11A to 11D, or FIG. 13 is applied to decompression processing which is performed by the JPEG decompressor 505.

On the other hand, image data received from an external apparatus via an interface (IF) or image data read out from an external memory may be data compressed by the usual JPEG compression. In this case, the order in which MCUs were compressed is the order in the usual JPEG compression such as that illustrated in FIGS. 1A to 1D. For example, the JPEG decompressor 505 may decompress such a JPEG image and the printer 508 may perform printing thereof. Then, at this time, depending on print settings (for example, duplex (two-sided) print setting and page multiple-up such as N-in-1), performing rotation of such a JPEG image may be required. In such a case, the decompressive DMAC 506 causes the JPEG decompressor 505 to perform blank decode such as that illustrated in FIGS. 4A to 4E, thus performing rotation decompression.

Additionally, for example, in a case where the image processing apparatus 500 transmits an image scanned by the scanner 502 to an external apparatus, the compressive DMAC 504 compresses MCUs according to the order of compression in the usual JPEG compression such as that illustrated in FIGS. 1A to 1D.

In this way, even in a case where the image processing apparatus 500 performs compression or decompression conforming to the usual JPEG processing, compression processing (for example, DCT) or decompression processing (for example, inverse DCT) to be performed on MCUs is able to use common processing irrespective of the order of compression or decompression. Therefore, the JPEG compressor 503 and the JPEG decompressor 505, which are used for the usual JPEG compression and decompression, are able to be used for compression processing illustrated in FIG. 6, FIG. 10, or FIG. 12 and decompression processing illustrated in FIGS. 8A to 8D, FIGS. 11A to 11D, or FIG. 13, respectively.

Furthermore, the JPEG compressor 503 and the JPEG decompressor 505 can be configured with hardware, such as circuits, or operations of the JPEG compressor 503 and the JPEG decompressor 505 can be configured by the CPU 501 executing a program. Similarly, the compressive DMAC 504 and the decompressive DMAC 506 can be configured with hardware, such as circuits, or operations of the compressive DMAC 504 and the decompressive DMAC 506 can be configured by the CPU 501 executing a program.

Additionally, in the above-described exemplary embodiments, the image processing apparatus 500 implements both compression processing performed by the JPEG compressor 503 and the compressive DMAC 504 and decompression processing performed by the JPEG decompressor 505 and the decompressive DMAC 506. However, the above-described exemplary embodiments are not limited to this, but compression processing performed by the JPEG compressor 503 and the compressive DMAC 504 and decompression processing performed by the JPEG decompressor 505 and the decompressive DMAC 506 can be implemented by the respective different image processing apparatuses. In this case, for example, an image processing apparatus serving as an image compression apparatus (for example, a digital camera) and an image processing apparatus serving as an image decompression apparatus (for example, a printer) are assumed to be provided by the same vendor. In this case, compression processing and decompression processing to be performed on MCUs according to the order corresponding to the rotational angle of an image in the above-described exemplary embodiments can be mounted in the respective image processing apparatuses. Accordingly, compression processing and decompression processing in the above-described exemplary embodiments can be implemented by the respective different image processing apparatuses.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-222719 filed Nov. 28, 2018, which is hereby incorporated by reference herein in its entirety.

What is claimed is:

1. An image processing apparatus comprising:
a compression unit configured to perform predetermined compression processing on each of a plurality of blocks included in an image targeted for processing;
an execution unit configured to perform predetermined decompression processing and rotation processing on compressed data obtained by the predetermined compression processing performed by the compression unit; and
an output unit configured to output decompressed data obtained by the predetermined decompression processing and the rotation processing performed by the execution unit,
wherein, after decompressed data corresponding to a first portion of the image targeted for processing is output by the output unit, the execution unit performs the predetermined decompression processing and the rotation processing on a second portion of the image targeted for processing, and
wherein in the predetermined compression processing performed on a predetermined block included in the first portion, the compression unit refers to a block which is different according to a rotational angle in the rotation processing in such a manner that compressed data corresponding to a block included in the second portion is not referred to in the predetermined decompression processing performed on the first portion.

2. The image processing apparatus according to claim 1, wherein the compression unit performs the predetermined compression processing according to a predetermined block order on a plurality of blocks included in each of the first portion and the second portion, and
wherein the execution unit performs the predetermined decompression processing according to the predetermined block order on compressed data corresponding to the plurality of blocks included in each of the first portion and the second portion.

3. The image processing apparatus according to claim 2, wherein the predetermined block order differs according to a rotational angle in the rotation processing.

4. The image processing apparatus according to claim 2, wherein the compression unit further compresses a plurality of blocks obtained by dividing the image targeted for processing according to a block order conforming to Joint Photographic Experts Group (JPEG), and
wherein the predetermined block order is different from the block order conforming to JPEG.

5. The image processing apparatus according to claim 4, wherein, in a case of not rotating the image targeted for processing, the compression unit compresses the plurality of blocks in the block order conforming to JPEG.

6. The image processing apparatus according to claim 1, wherein the execution unit sets the first portion and the second portion based on a rotational angle in the rotation processing.

7. The image processing apparatus according to claim 1, further comprising:
a scan unit configured to scan an original; and
a print unit configured to print a scanned image obtained by scanning performed by the scan unit,
wherein the image targeted for processing is the scanned image, and wherein the print unit prints the scanned image compressed by the compression unit and decompressed by the execution unit.

8. The image processing apparatus according to claim 1, wherein the output unit writes decompressed data corresponding to the first portion stored in a predetermined memory region in a memory different from the predetermined memory region.

9. The image processing apparatus according to claim 1, wherein the predetermined compression processing includes conversion of image data corresponding to one block into frequency data and calculation of a difference between a direct-current component value of the one block in the frequency data obtained by the conversion and a direct-current component value of a different block,
wherein the predetermined decompression processing includes addition of the difference to the direct-current component value of the different block and conversion of frequency data obtained by the addition into image data, and
wherein the compression unit causes the predetermined block included in the first portion and the different block from which a difference of the direct-current component value is calculated to differ according to a rotational angle in the rotation processing in such a manner that a direct-current component value corresponding to a block included in the second portion is not referred to in addition of the difference to the first portion.

10. An image processing method comprising:
performing predetermined compression processing on each of a plurality of blocks included in an image targeted for processing;
performing predetermined decompression processing and rotation processing on compressed data obtained by the predetermined compression processing; and
outputting decompressed data obtained by the predetermined decompression processing and the rotation processing,
wherein, after decompressed data corresponding to a first portion of the image targeted for processing is output, the predetermined decompression processing and the rotation processing are performed on a second portion of the image targeted for processing, and
wherein a block which is referred to in the predetermined compression processing performed on a predetermined block included in the first portion is different according to a rotational angle in the rotation processing in such a manner that compressed data corresponding to a block included in the second portion is not referred to in the predetermined decompression processing performed on the first portion.

11. The image processing apparatus according to claim 10,
wherein the predetermined compression processing is performed according to a predetermined block order on a plurality of blocks included in each of the first portion and the second portion, and
wherein the predetermined decompression processing is performed according to the predetermined block order on compressed data corresponding to the plurality of blocks included in each of the first portion and the second portion.

12. The image processing apparatus according to claim 11, wherein the predetermined block order differs according to a rotational angle in the rotation processing.

13. The image processing apparatus according to claim 11,
wherein a plurality of blocks obtained by dividing the image targeted for processing is compressed according to a block order conforming to Joint Photographic Experts Group (JPEG), and
wherein the predetermined block order is different from the block order conforming to JPEG.

14. The image processing apparatus according to claim 13, wherein, in a case where the image targeted for processing is not rotated, the plurality of blocks is compressed in the block order conforming to JPEG.

15. The image processing apparatus according to claim 10, wherein the first portion and the second portion are set based on a rotational angle in the rotation processing.

16. The image processing apparatus according to claim 10, further comprising:
scanning an original; and
printing a scanned image obtained by scanning the original,
wherein the image targeted for processing is the scanned image, and
wherein the scanned image compressed and decompressed is printed.

17. The image processing apparatus according to claim 10, wherein decompressed data corresponding to the first portion stored in a predetermined memory region is written in a memory different from the predetermined memory region.

18. The image processing apparatus according to claim 10,
wherein the predetermined compression processing includes conversion of image data corresponding to one block into frequency data and calculation of a difference between a direct-current component value of the one block in the frequency data obtained by the conversion and a direct-current component value of a different block,
wherein the predetermined decompression processing includes addition of the difference to the direct-current component value of the different block and conversion of frequency data obtained by the addition into image data, and
wherein the predetermined block included in the first portion and the different block from which a difference of the direct-current component value is calculated are caused to differ according to a rotational angle in the rotation processing in such a manner that a direct-current component value corresponding to a block included in the second portion is not referred to in addition of the difference to the first portion.

19. An image processing apparatus comprising:
a compression unit configured to perform predetermined compression processing on each of a plurality of blocks included in an image targeted for processing; and
an execution unit configured to perform predetermined decompression processing and rotation processing on compressed data obtained by the predetermined compression processing performed by the compression unit;
wherein the compression unit refers to a different block in the predetermined compression processing performed on a predetermined block,
wherein the execution unit refers to compressed data corresponding to the different block in the predetermined decompression processing performed on compressed data corresponding to the predetermined block, and wherein the compression unit and the execution unit cause the different block to differ according to a rotational angle in the rotation processing.

\* \* \* \* \*